(12) United States Patent
Barrett et al.

(10) Patent No.: US 8,777,157 B2
(45) Date of Patent: Jul. 15, 2014

(54) TETHERED HOVERING PLATFORM

(75) Inventors: Ronald M. Barrett, Lawrence, KS (US);
David N. Borys, San Diego, CA (US);
Alex Gladbach, Houston, TX (US);
Dustin Grorud, Milbank, SD (US);
Andrew Spalding, St. Louis, MO (US)

(73) Assignee: University of Kansas, Lawrence, KS (US)

( * ) Notice: Subject to any disclaimer, the term of this patent is extended or adjusted under 35 U.S.C. 154(b) by 735 days.

(21) Appl. No.: 12/610,055

(22) Filed: Oct. 30, 2009

(65) Prior Publication Data
US 2010/0108807 A1 May 6, 2010

Related U.S. Application Data

(60) Provisional application No. 61/110,526, filed on Oct. 31, 2008.

(51) Int. Cl.
*B64F 1/12* (2006.01)
*B64C 27/20* (2006.01)
*B64C 39/02* (2006.01)

(52) U.S. Cl.
CPC .............. *B64C 39/022* (2013.01); *B64C 27/20* (2013.01); *B64C 2201/127* (2013.01); *B64C 2201/108* (2013.01); *B64C 39/024* (2013.01); *B64C 2201/042* (2013.01); *B64C 2201/148* (2013.01); *B64C 2201/027* (2013.01); *B64C 39/028* (2013.01)
USPC ......................................... 244/115; 244/12.2

(58) Field of Classification Search
USPC ......... 244/12.2, 23 C, 30, 31, 33, 114 R, 115, 244/153 R
See application file for complete search history.

(56) References Cited

U.S. PATENT DOCUMENTS

| | | | | |
|---|---|---|---|---|
| 2,953,321 | A | * | 9/1960 | Robertson et al. ........... 244/23 C |
| 3,005,603 | A | * | 10/1961 | Gaskins ............................ 244/6 |
| 3,148,847 | A | * | 9/1964 | Manificat .................... 244/17.17 |
| 3,149,803 | A | * | 9/1964 | Petrides et al. ............ 244/17.13 |

(Continued)

OTHER PUBLICATIONS

Hirschberg, M., and Daley, D., "US and Russian Helicopter Development in the 20th Century," American Helicopter Society International, Jul. 2000.

(Continued)

*Primary Examiner* — Tien Dinh
*Assistant Examiner* — Keith L Dixon
(74) *Attorney, Agent, or Firm* — Mark E. Stallion, Esq.; Husch Blackwell LLP

(57) ABSTRACT

The design and refinement of a tethered hovering platform into a feasible working system is presented. To determine a starting point for the design, a detailed historical search was conducted to find the history and the current state of such technology. Real world current needs are analyzed to produce a mission specification and to drive the preliminary vehicle design. Analysis of environmental conditions and decisions about an initial payload package are made in conjunction with motor and propeller sizing. Initial concept testing to discover feasibility and operational issues was performed; from this, instability issues were discovered. Analyzing these instability issues using known rotorcraft and momentum effects, in conjunction with flight testing, yields possible solutions to the problem. The use of constrained layer dampers as a means of passive stabilization is addressed and suggested as the preferred solution. Testing of passive constrained layer damping verifies the stability of the solution. The system components and manufacturing cost is presented in comparison to current systems using active stabilization.

30 Claims, 21 Drawing Sheets

THP Axis and Term Definitions

(56) References Cited

U.S. PATENT DOCUMENTS

| | | | | |
|---|---|---|---|---|
| 5,560,589 | A * | 10/1996 | Gran et al. | 267/3 |
| 5,595,358 | A * | 1/1997 | Demidov et al. | 244/7 A |
| 5,803,199 | A * | 9/1998 | Walter | 180/120 |
| 6,142,414 | A * | 11/2000 | Doolittle | 244/25 |
| 6,450,445 | B1 * | 9/2002 | Moller | 244/23 A |

OTHER PUBLICATIONS

Focke Achegelis Fa 330, http://en.wikipedia.org/wiki/Focke Achgelis Fa 330, [retrieved Jul. 2008].
U.S. Centennial of Flight Commission, "Balloons in the American Civil War," http://www.centennialofflight.gov, [retrieved May 2008].
Goller, W., "Tethered Rotorplatforms and Their Mission Potential," AUVSI Library, 1980.
Hiller VZ-1 'Pawnee', http://www.aviastar.org/helicopters eng/hiller platform.php, [retrieved Jul. 2008].
Taylor, John W.R., Janes: All the Worlds Aircraft, Sampson Low Marston and Co. Ltd, London, 1971-1972.
Taylor, John W.R., Janes: All the Worlds Aircraft, Janes Publishing Co., London, 1979-1980.
Taylor, John W.R., Janes: All the Worlds Aircraft, Janes Publishing Co., London, 1966-1967.
Tsach, S., Chemla, J., and Penn, D., "UAV Systems Development in IAI-Past, Present & Future," AIAA2003-6535, Sep. 2003.
Avanzini, G., D'Angelo, S. and Matteis, G., "Development of a Shrouded-Fan UAV for Environmental Monitoring," AIAA 2004-6383, Chicago, Illinois, Sep. 2004.
Sikhorsky Cypher, http://www.nosc.mil/robots/images/mssmp.jpg, [retrieved May 2008].
CL-227 Sentinel/CL-327 Guardian, http://www.fas.org/man/dod-101/sys/ac/row/cl-327.htm, [retrieved May 2008].
Flemming, J., Jones, T., and Ng, W., "Improving Control System Effectiveness for Ducted Fan VTOL UAVs Operating in Crosswinds," AIAA 2003-6514, Sep. 2003.
AD&D Hummingbird, http://www.aviastar.org/helicopters eng/add platform.php, [retrieved Aug. 2007].
Crane, D., "Micro Air Vehicle: Backpackable UAV for Tactical Reconnaissance & Surveillance," Defense Review, May 2008.
Micro Air Vehicle Spec. Sheet, Honeywell Corporation, www.honeywell.com, [retrieved May 2008].
Honeywell's 13 inch Unmanned Aerial Vehicle completes successful 'untethered' free flight, Shephard Group, www.shephard.co.uk, [retrieved May 2008].
Brewer, K., U. S. Army Pfc., "High-Tech Micro Air Vehicle Will Battle with Soldiers," www.blackanthem.com [retrieved May 2008].
UAVs get smaller: the Micro Air Vehicle nears readiness, www.gizmag.com, retrieved May 2008.
Infantry Unmanned Air Vehicle (UAV) Requirements and Issues, PowerPoint Presentation, U.S. Army Infantry Center, Ft. Benning Georgia, May 2008.
Feickert, A., CRS Report for Congress, "The Army's Future Combat System (FCS): Background and Issues for Congress," May 12, 2008.
Vehicles Collectors Club, http://www.armytrucks.org, [retrieved Jan. 2008].
Photograph, http://www.defense-aerospace.com/base/util/82762 1.jpg, [retrieved 2008].
Downtown Baghdad Houses, http://pbase.com/sgt_chip/image/49252628, [retrieved Jun. 2006].
Department of the Army, "Memorandum for the Commander, U.S. Army Training and Doctrine Command," Unclassified Version, Fort Leonard Wood, Missouri, Aug. 2007.
Gyrocam Systems, http://www.gyrocamsystems.com/home.html, [retrieved May 2008].
Photograph, http://www.mtreiten.com/soldier/AfghanistanSights.htm, [retrieved Jul. 2008].
Spy Camera Specialists, www.spycameras.com, [retrieved Jan. 2008].
Axi Brushless Outrunner 2203, http://www3.towerhobbies.com/cgi ¬bin/wti000 1p?&I=LXPPV2&P=FR [retrieved Nov. 2007].
Thrust HP Software, http://ajmas.dyndns.org/thrusthp/imperial/ [retrieved Jul. 2006].
Gladbach, A., and Spalding, A., "Analysis of Tethered Hovering Platform Gaits and Instability Control," Jun. 2006.
Lim,K.B., Shin, J-Y, Moerder, D.D., Cooper, E.G., Khong, T.H., and Smith, M.F., "An Overview of the NASA Flying Test Platform Research," AIAA 2003-5775, Aug. 2003.
Lim,K.B., Shin, J-Y, Moerder, D.D., "Bias Momentum Sizing for Hovering Dual-Spin Platforms" AIAA 2005-5973, Aug. 2005.
3M Corporation, "Viscoelastic Damping Polymer 110," Technical Data Sheet, Apr. 2003.
Barrett-Gonzales, Ronald, Introduction to Adaptive Aerostructures, University of Kansas, 2006.
ASTM International, "Standard Test Method for Measuring Vibration-Damping Properties of Materials," E 756-04.
http://en.wikipedia.org/wiki/Damping ratio [Retrieved Aug. 2008].
Nice, Eryk Brian, Design of a Four Rotor Hovering Vehicle, A Thesis presented to the Graduate School of Cornell University, May 2004.

* cited by examiner

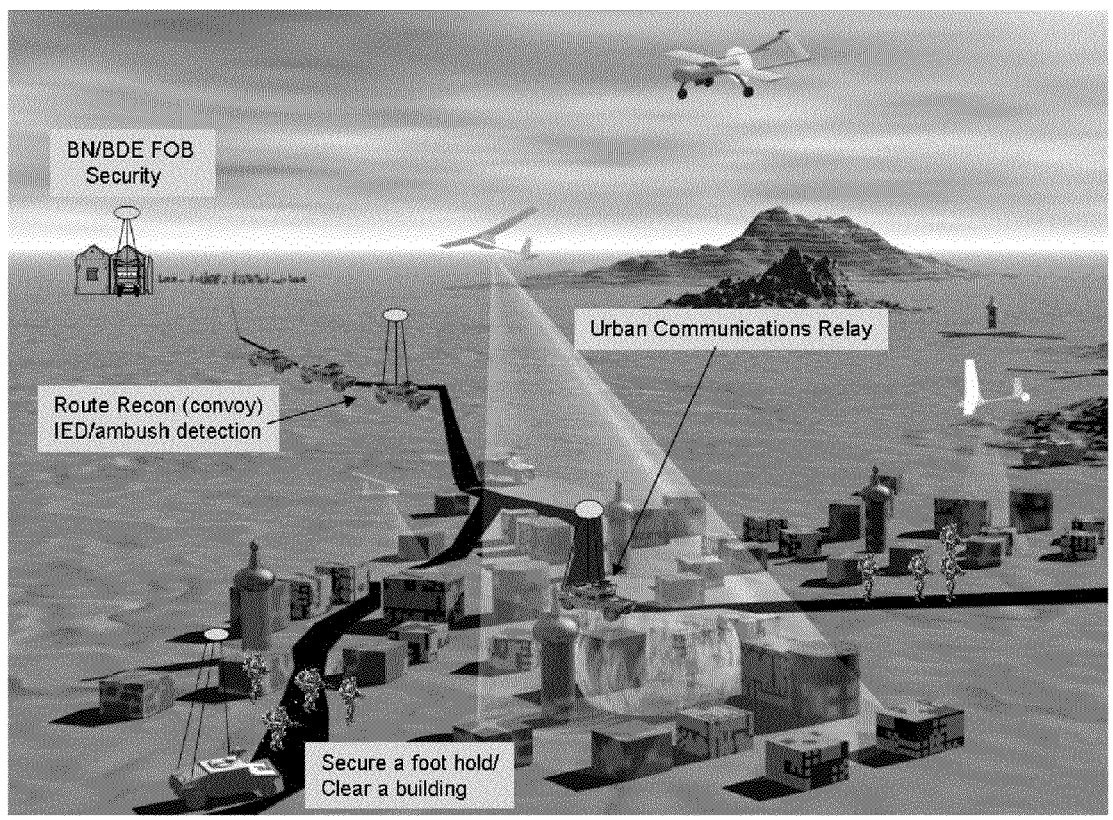
Figure 1 - Depiction of Mission Possibilities

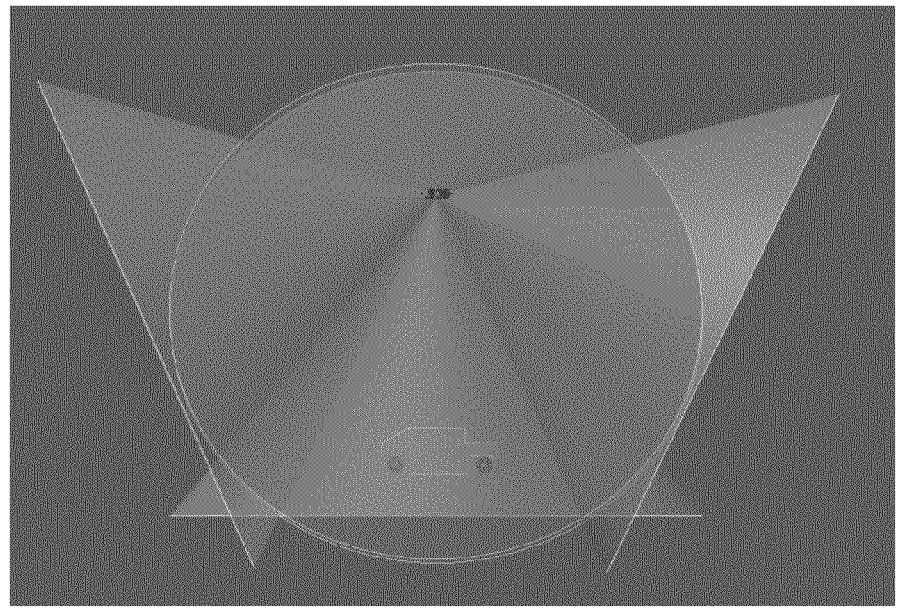
Figure 2 - THP Fixed Camera Field of View at 50ft
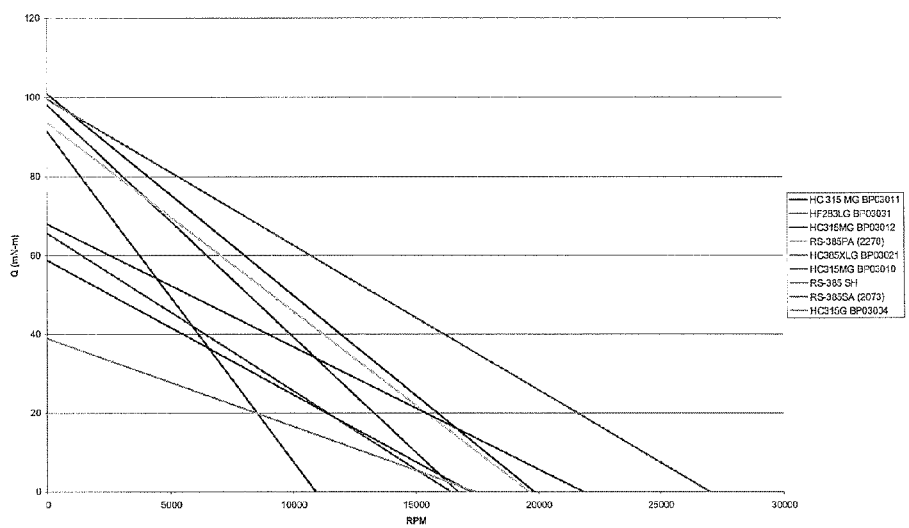
Figure 3 - Motor Stall Torque Data

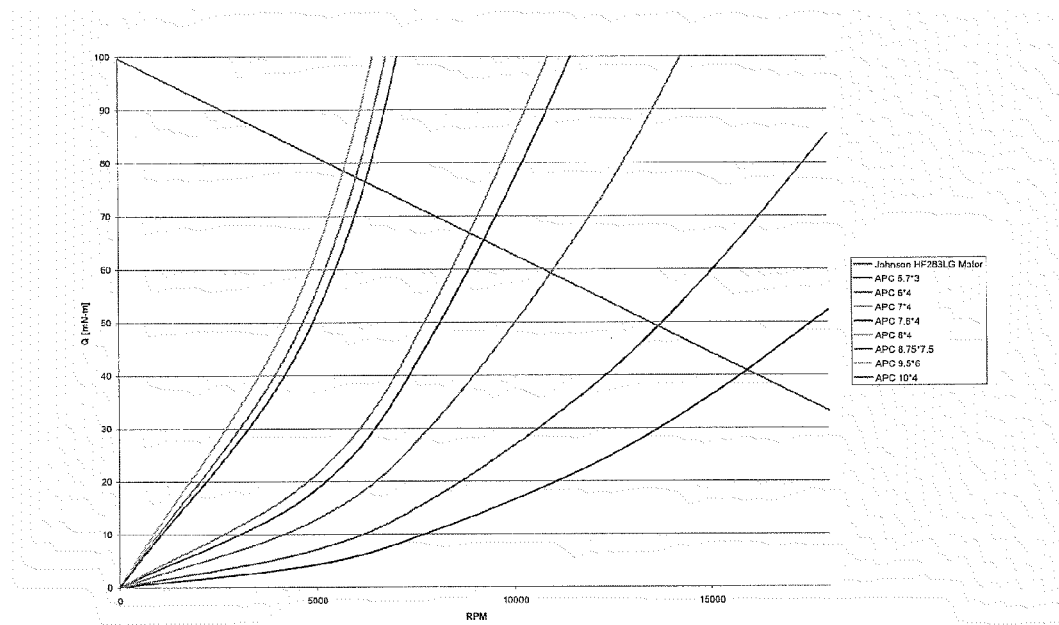
Figure 4 - Propeller and Motor Torque vs RPM Overlay
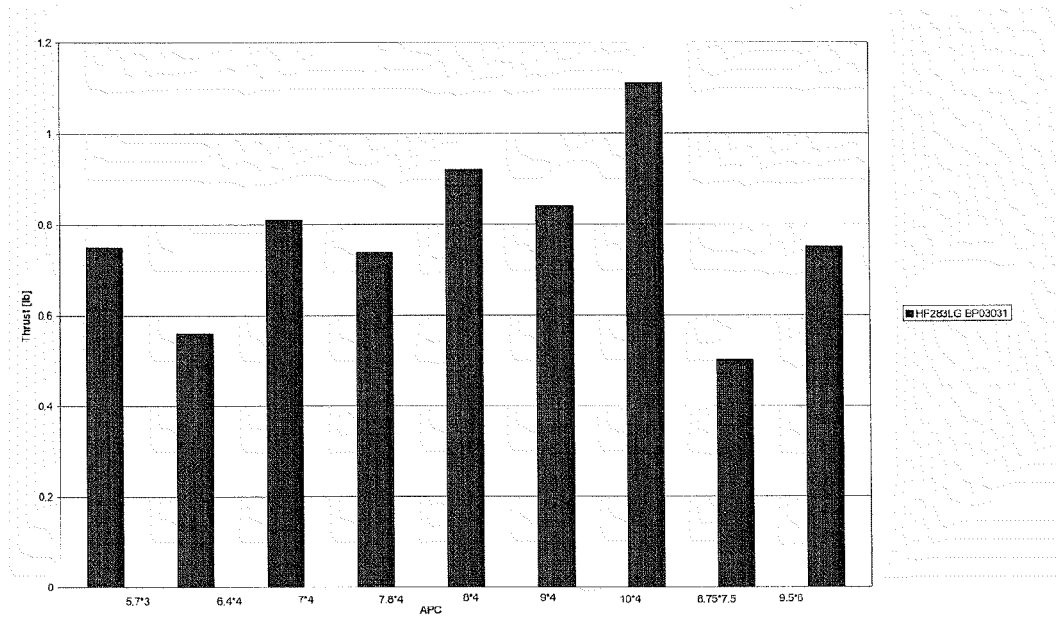
Figure 5 - Thrust at Each Intersection

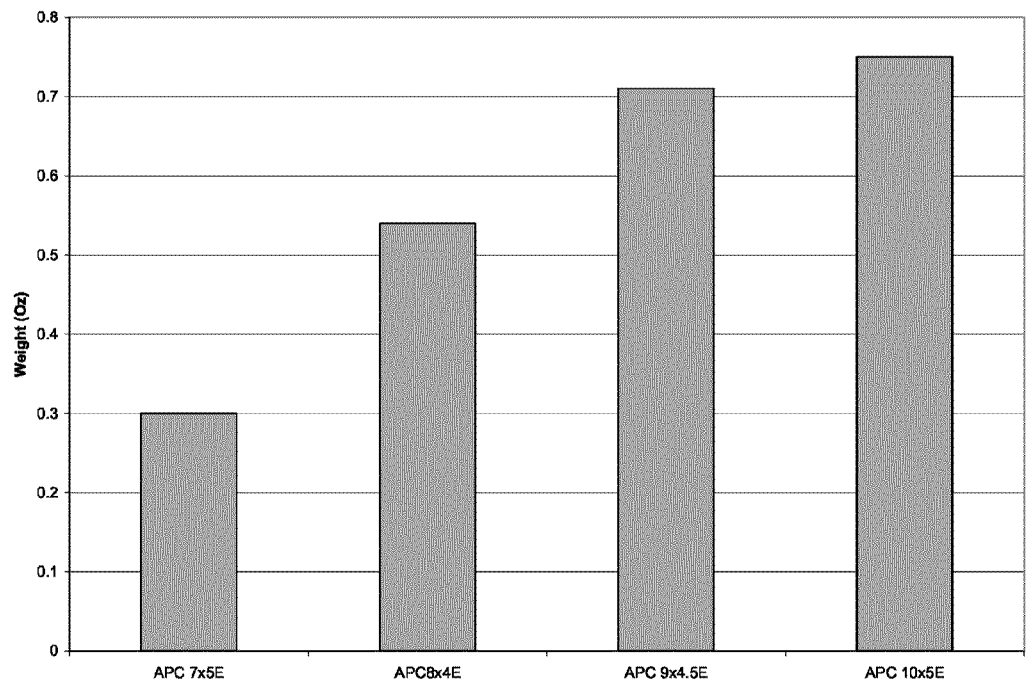
Figure 6 Selected APC Propeller Weights
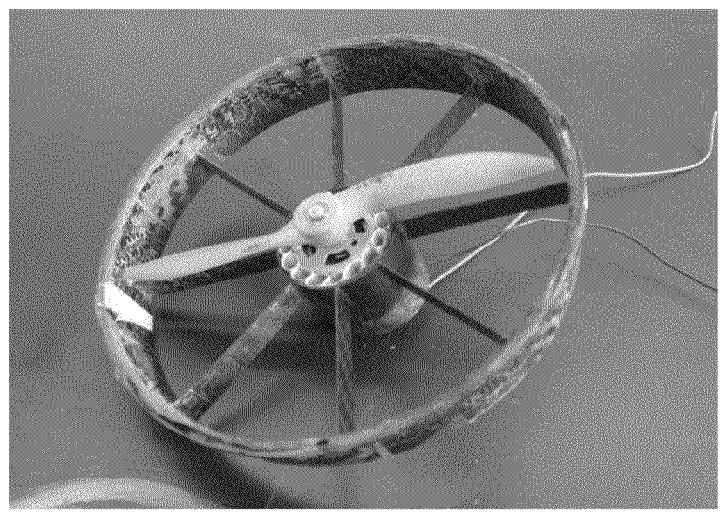
Figure 7 - THP Prototype

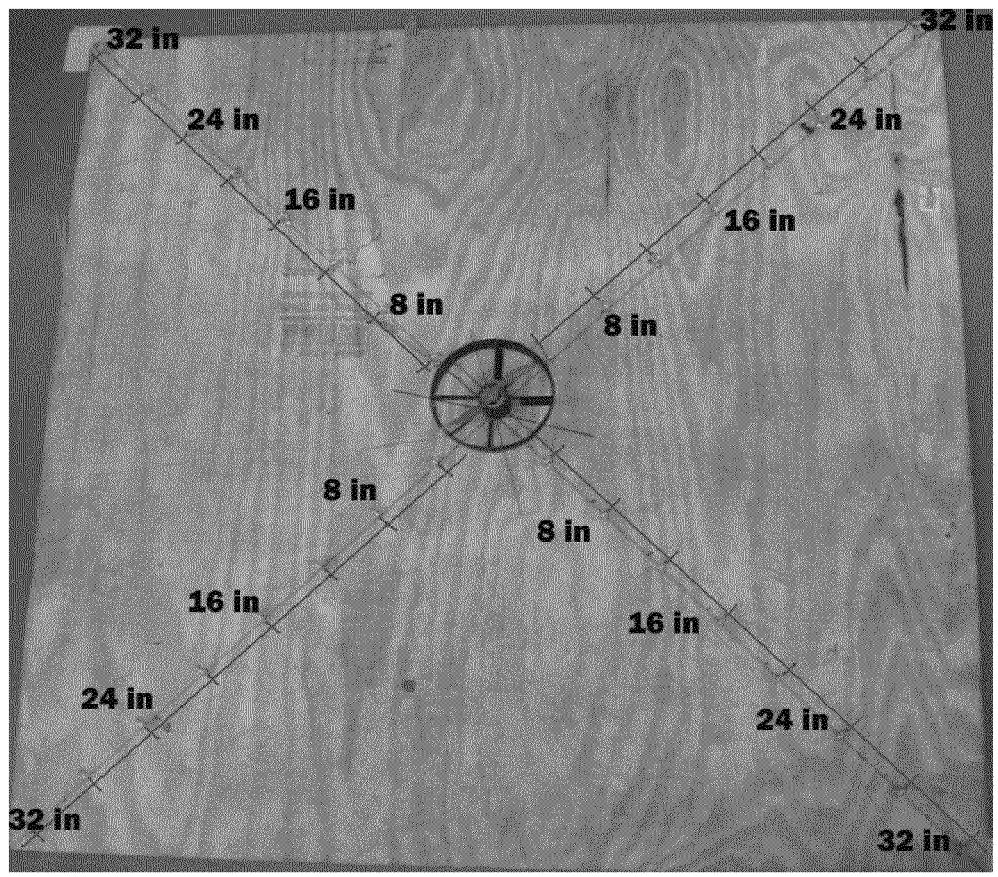
Figure 8 - Initial THP Test Setup

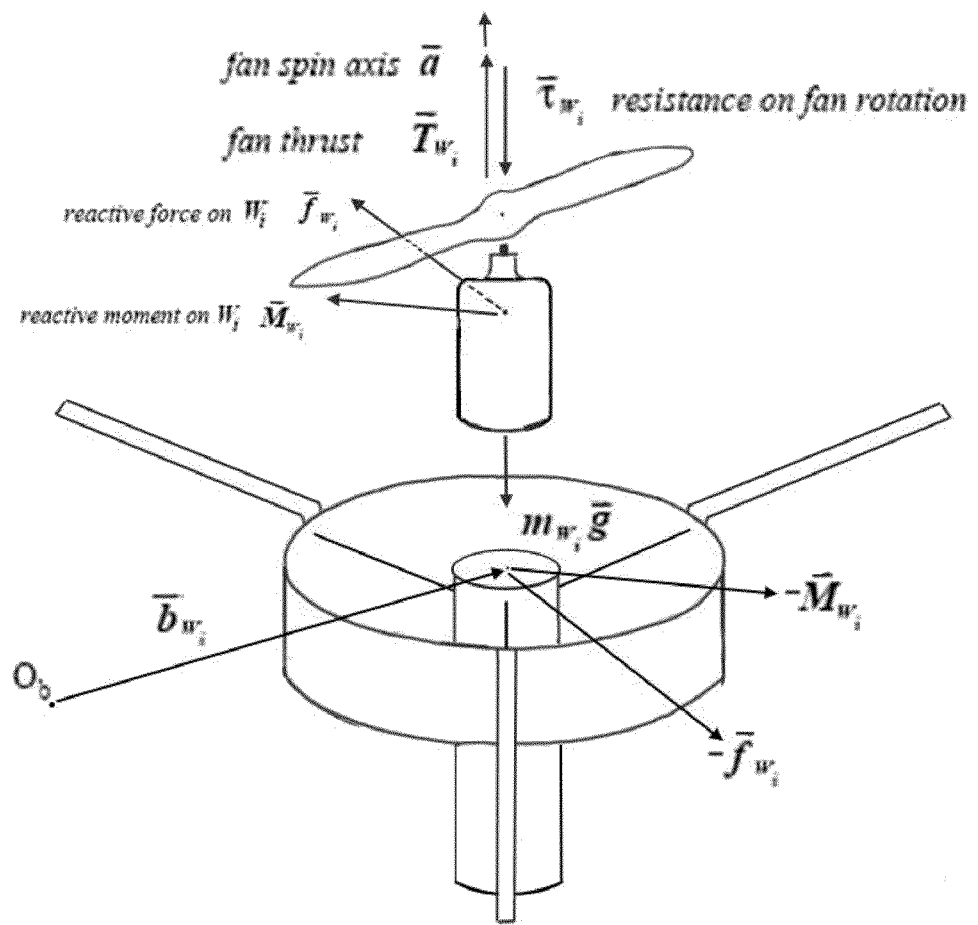
Figure 9 - THP Axis and Term Definitions

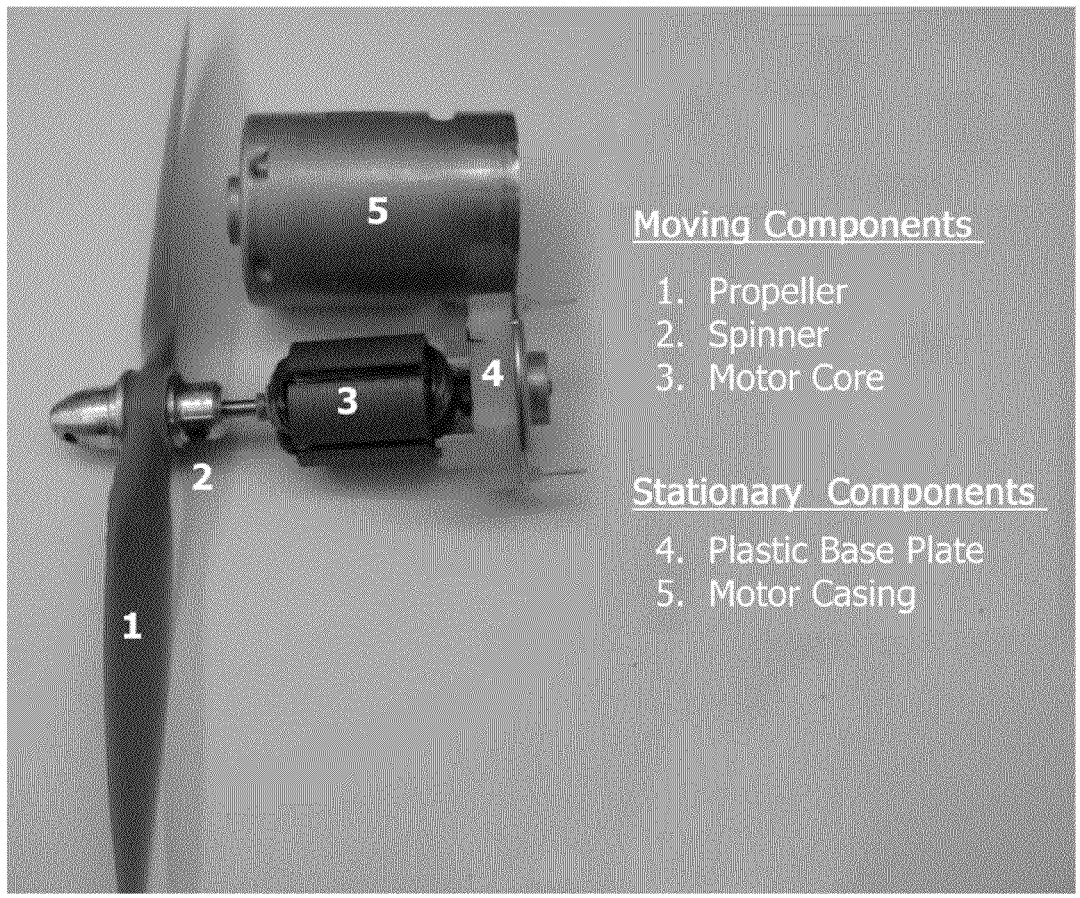
Figure 10 - Motor Sections Showing Internal Rotating Components

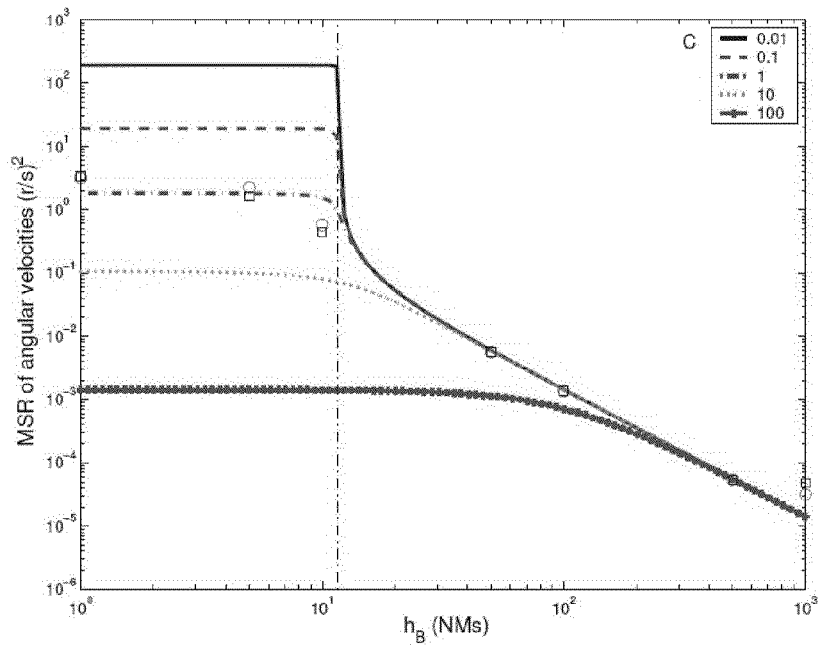
Figure 11 - Effect of Rotating Momentum on Platform Wobble Response
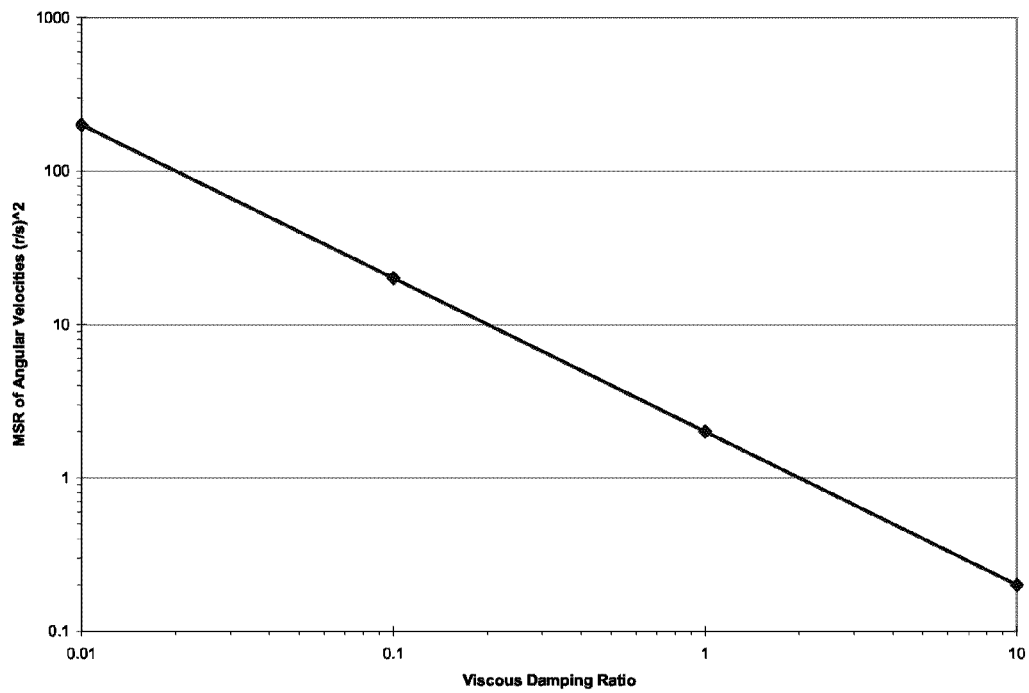
Figure 12 Effect of Damping on Platform Mean Frequency Response

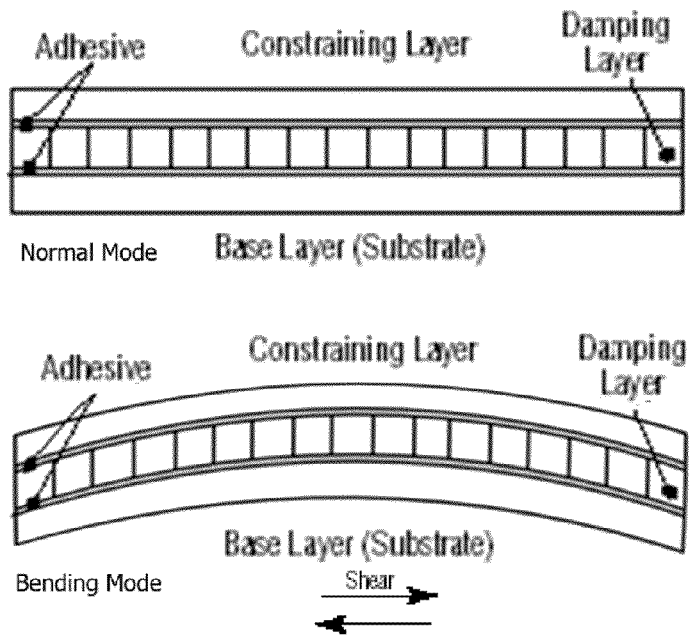
Figure 13 - Constrained Layer Damping Diagram
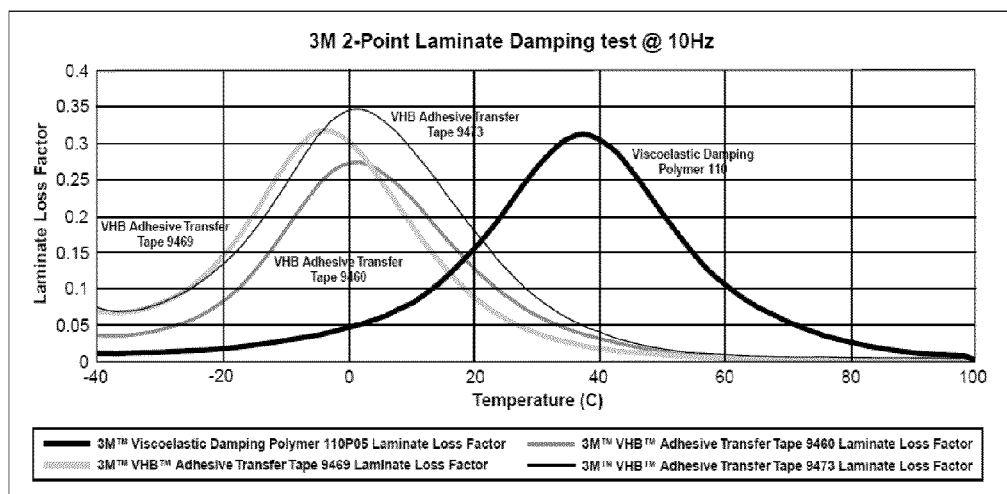
Figure 14 - 3M Damping Polymer Performance Comparison (Courtesy 3M)

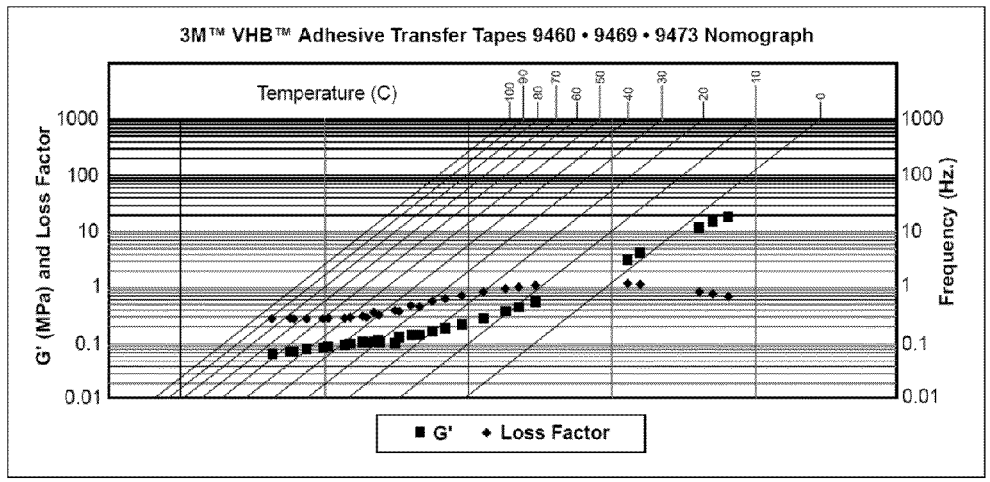
Figure 15 - 3M Damping Polymer Tape Nomograph (Courtesy 3M)
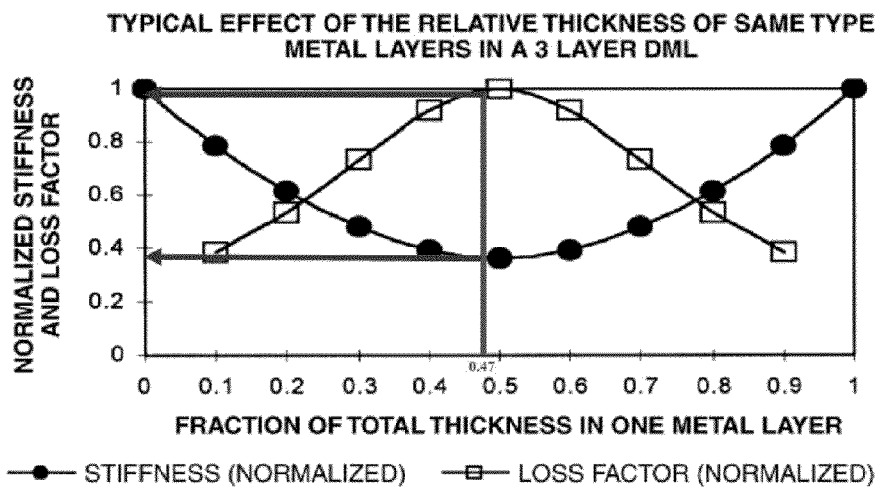
Figure 16 - Three Layer Geometric Stiffness and Loss Factor Plot (Courtesy 3M)

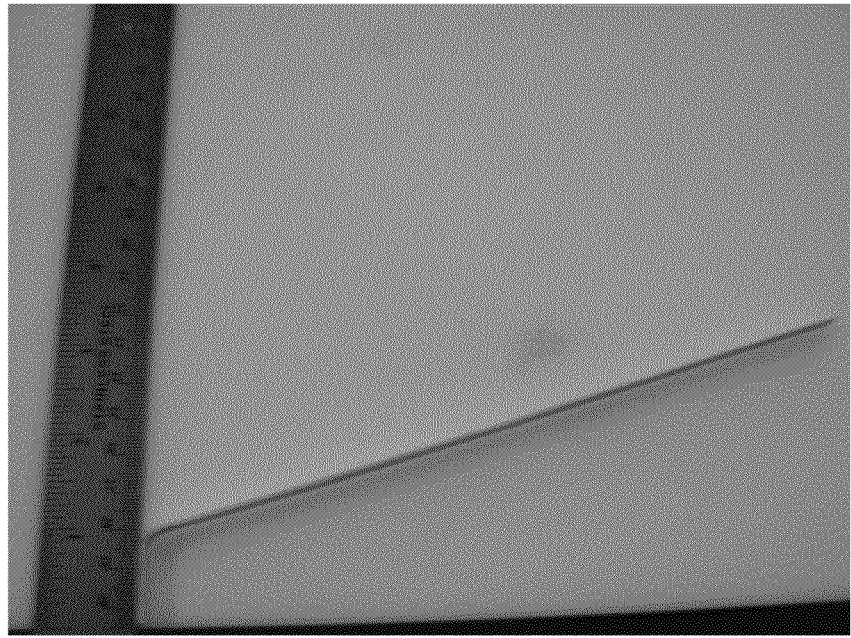
Figure 17 - Damper Bent Upward for Proper Flight Performance
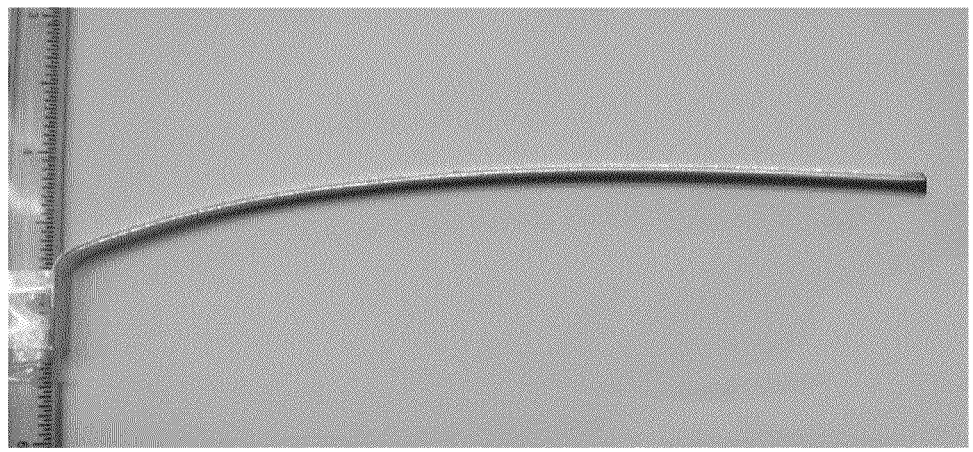
Figure 18 - Damper Showing Approximate Loaded Flight Shape

Figure 19 - Dampers Test Fit Onto Platform Frame
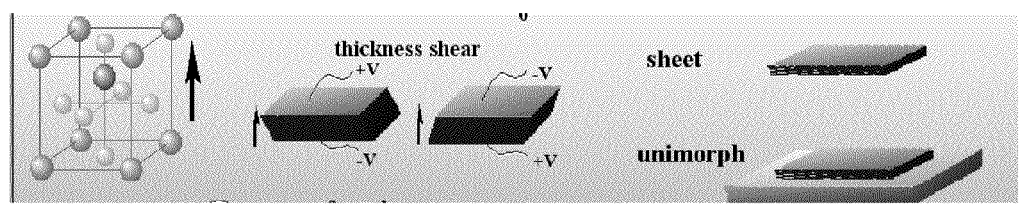
Figure 20 - PZT Characteristics

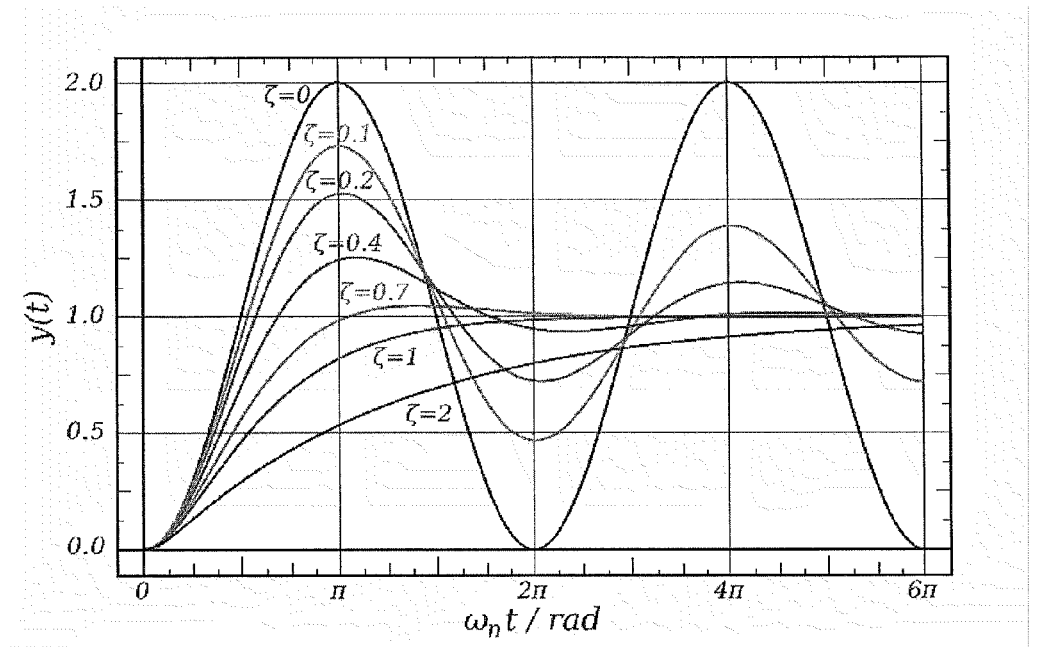
Figure 21 - Effect of Damping Ratio on log Decrement
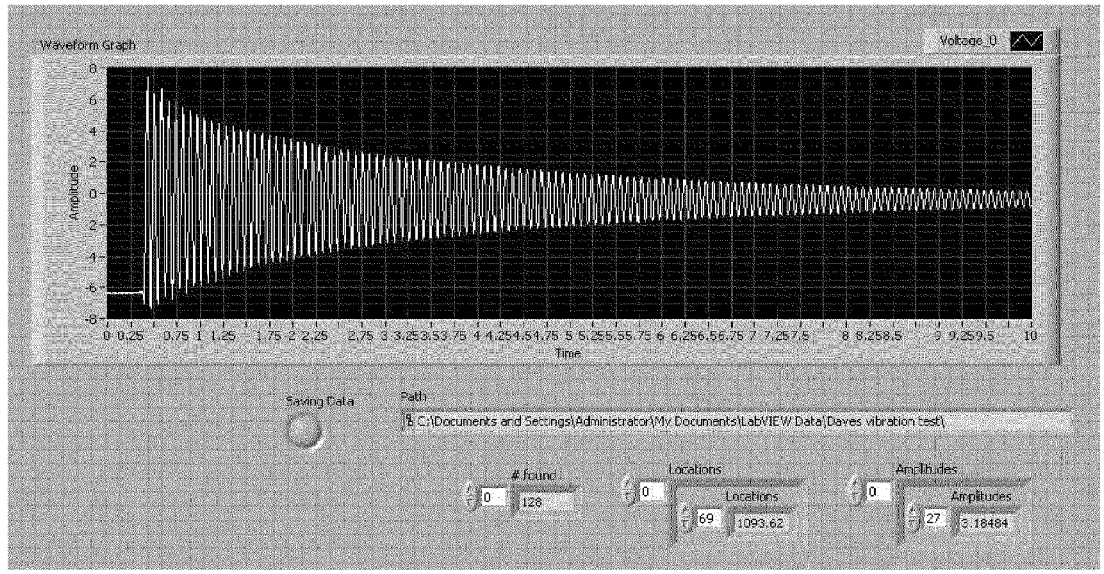
Figure 22 - .032" Aluminum Un-damped Beam Response

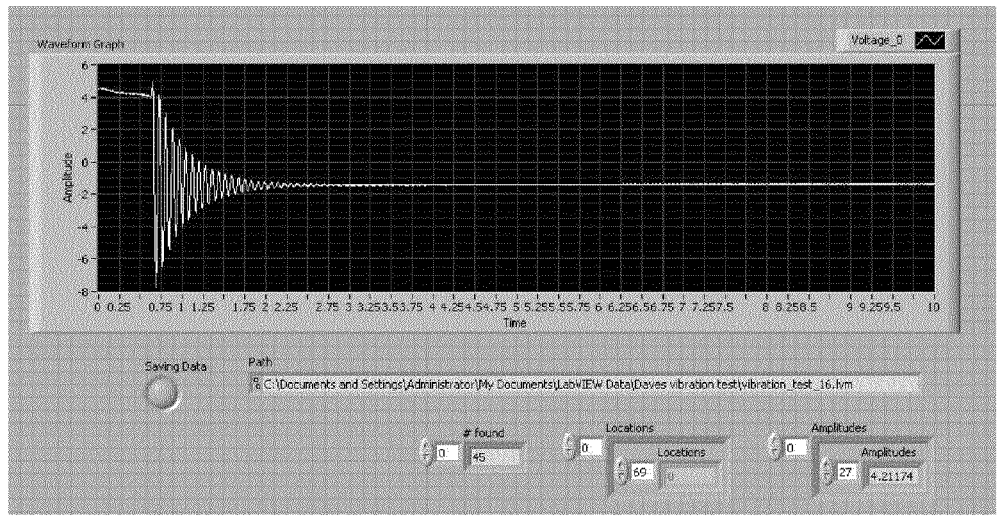
Figure 23 - .034" Damped Aluminum Beam Response over 10 second period
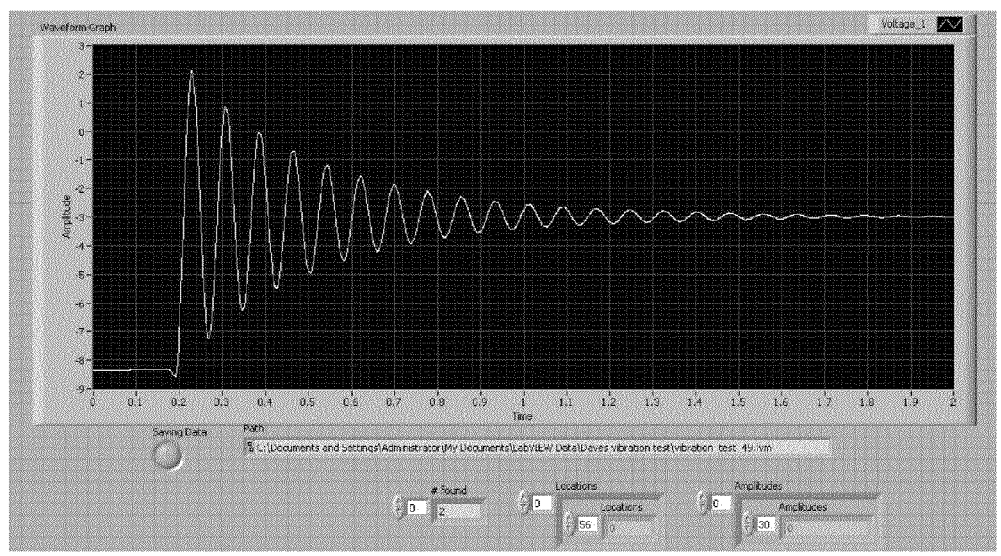
Figure 24 - Close Up of Damped Beam Response

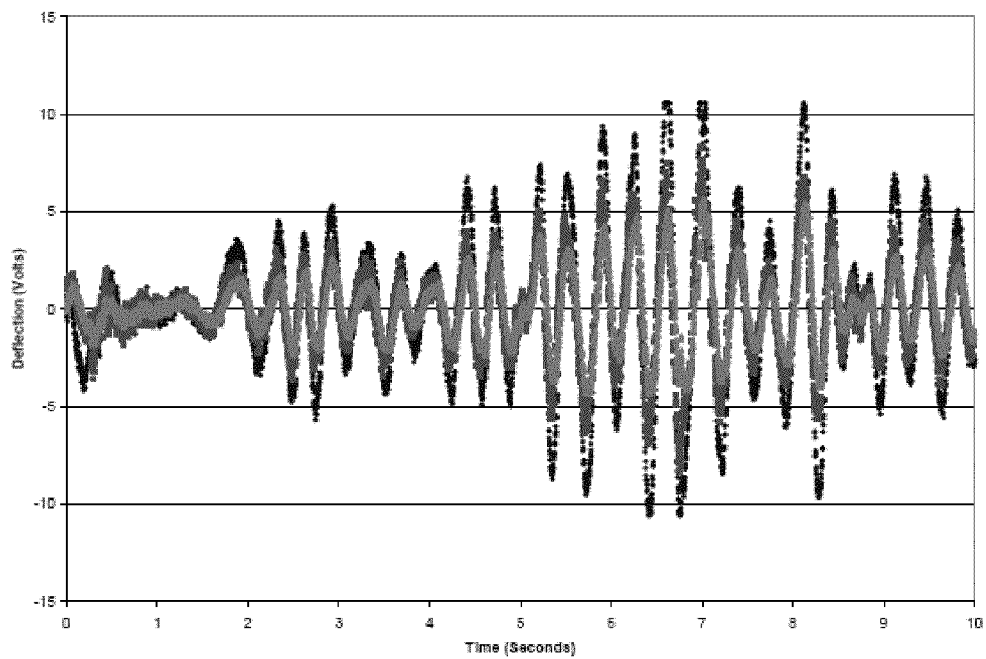
Figure 25 - Undamped Platform Response, H = 6ft  $V_{gust}$ = 6.4 mph Test 2

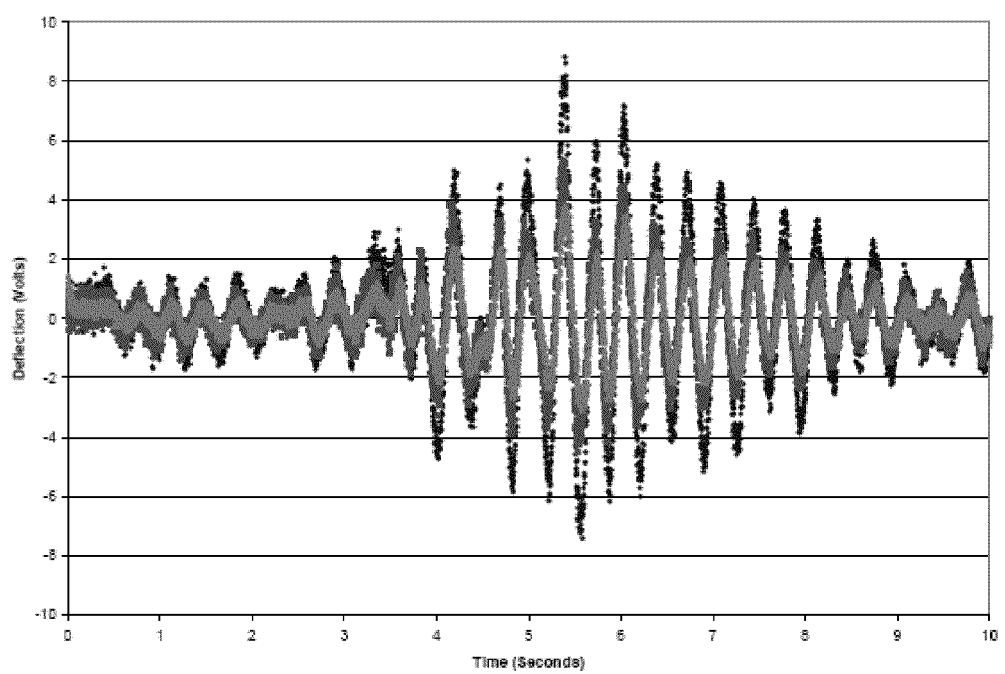
Figure 26 - Undamped Platform Response, H = 6ft $V_{gust}$ = 6.4 mph Test 9

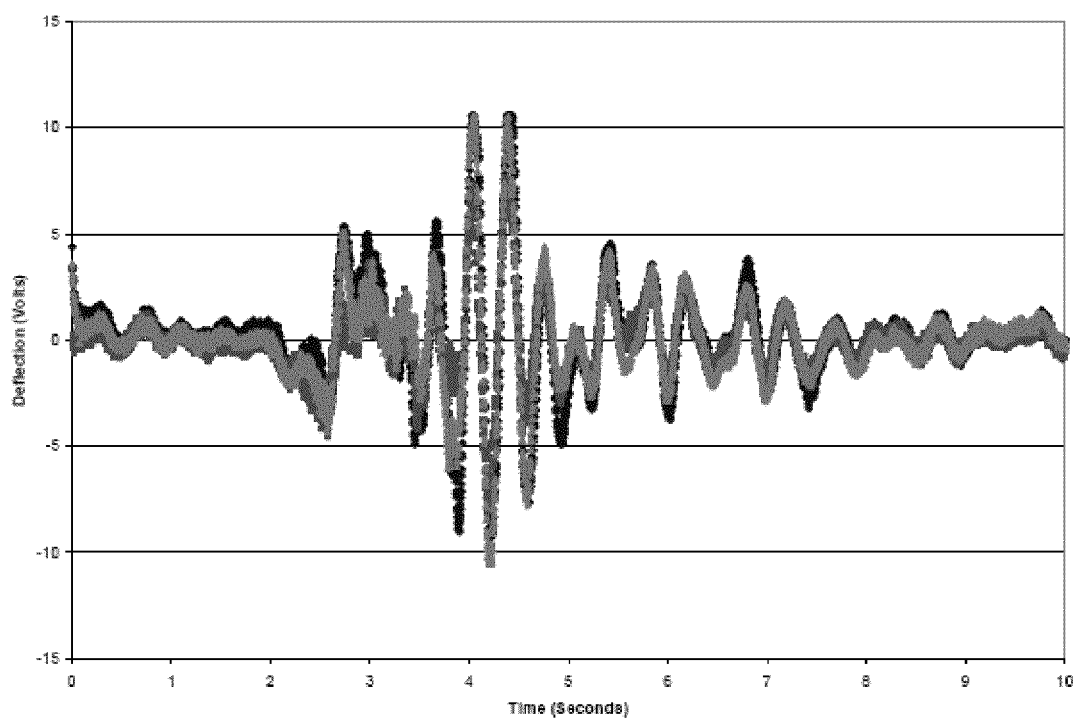
Figure 27 - Damped Platform Response, H = 6ft  $V_{gust}$ = 6.4 mph Test 7

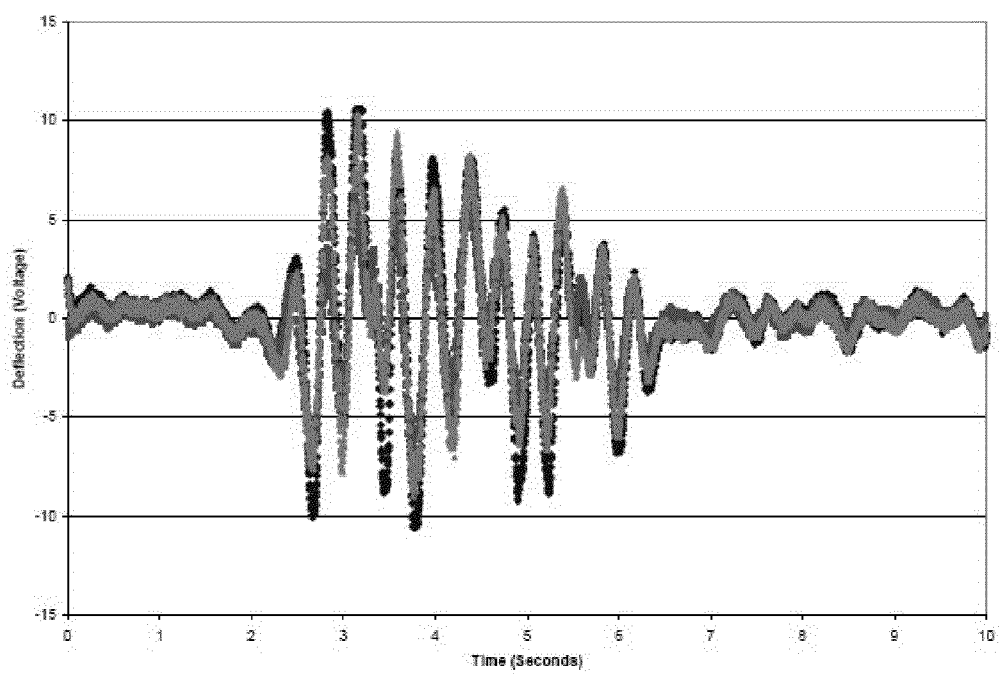
Figure 28 - Damped Platform Response, H = 6ft  $V_{gust}$ = 6.4 mph Test 13

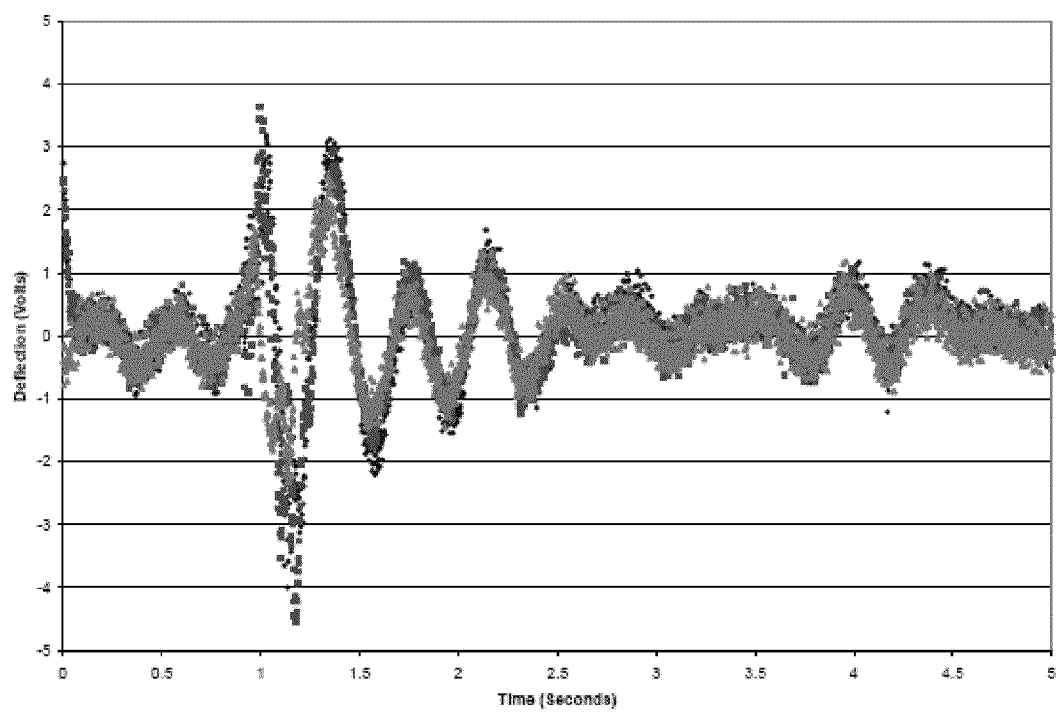
Figure 29 - Damped Platform Response, H = 20ft Test 10

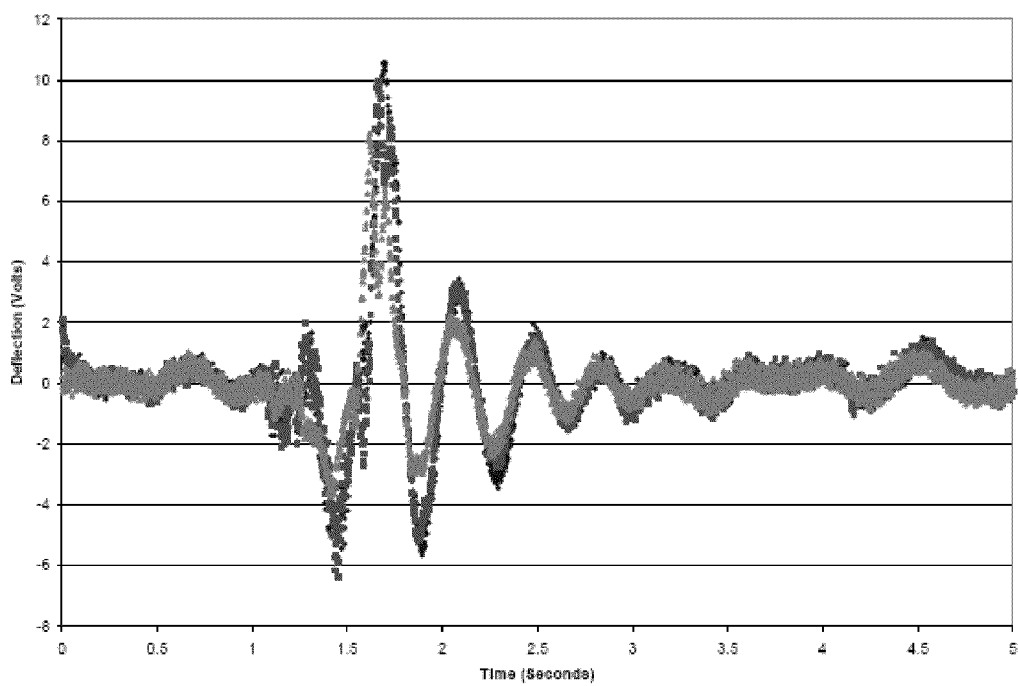
Figure 30 - Damped Platform Response, H = 20ft Test 12

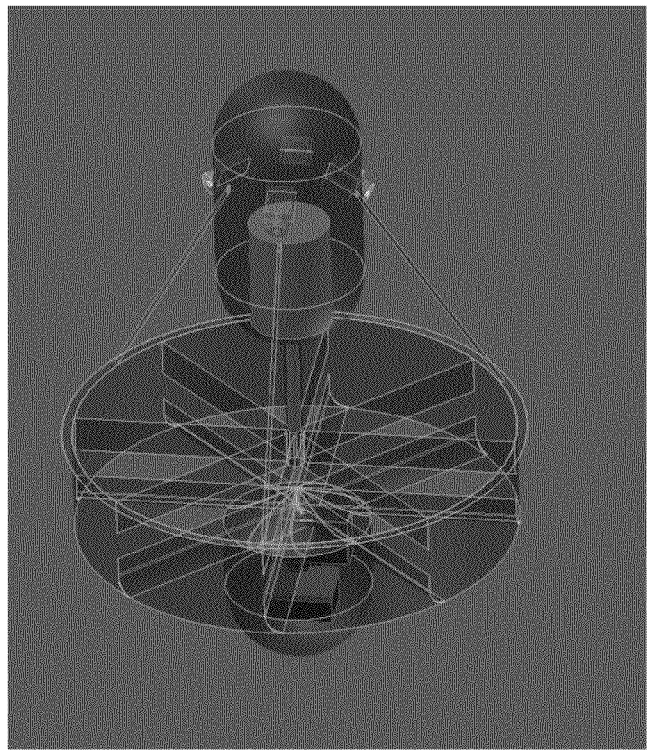
Figure 31 - Computer Drawing of Possible Configuration

TETHERED HOVERING PLATFORM

CROSS-REFERENCE TO RELATED APPLICATION

This application claims the benefit of and priority to U.S. Provisional Patent Application Ser. No. 61/110,526, filed Oct. 31, 2008, entitled TETHERED HOVERING PLATFORM, which application is hereby incorporated by reference to the extent permitted by law.

BACKGROUND OF INVENTION

1. Field of Invention

This invention relates generally to tethered hovering platforms (THP), and more specifically to tethered hovering platforms utilizing composite material, lightweight motors and lightweight high strength tethers.

2. Background Art

Inventors attempting to perfect early helicopter designs used tethers to add stability and safety during testing and development. The idea of using tethers was re-visited by the Germans and the French in World War II. The German Navy successfully deployed the Fa 330, an un-powered helicopter towed behind submarines. In the decade after WWII designs of extremely large, unmanned, single and multiple tethers hovering platforms such as the German KIEBITZ and the French Nord 510 were explored and prototypes were tested. These ideas were abandoned after only a few years of testing and development.

Hovering vehicles of today use onboard active stabilization systems for control. These systems after years of development have enabled vehicles such as the Sikorsky Cypher and Canadair C1-227 Sentinel to hover and fly in a stable manner and execute desired mission profiles. However, the stability of these craft comes at a very high cost, and the acquisition and maintenance costs of these craft are considerable. Intricate electronics of a complicated hovering vehicle include multiple piezoelectric gyroscopes, servos for actuation of control surfaces and motors, and occasionally onboard computers for autonomous flight. Two good examples of this type of vehicle are the Sikorsky Cypher and the Honeywell MAV. While these examples are very innovative, none have been commercially used for the missions that they were designed for. The problems with these concepts are that they are too expensive, difficult to maintain, have complicated deployment and recovery systems, and they are challenging to control.

Tethered observation balloons were first used for reconnaissance in the U.S. Civil War by both the Union and Confederate armies. Thaddeus Lowe helped develop the initial concept and helped establish the first balloon core, which he commanded. The first tethered observation balloon saw service on Sep. 24, 1861. On this date Lowe himself telegraphed intelligence about the Confederate troops at Falls Churce Va., over 3 miles from where his balloon was located. Un-powered Observation balloons remained in service with the both Allied and German ground and naval forces through WWII. These balloons became easy targets for aircraft and their usefulness was severely limited.

Tethered Rotorplatforms and Their Mission Potential by Wener Goller 1980 is an early publication on the topic of rotor platforms. The paper covers several topics of great importance to the topic at hand. The first is the definition and mission outline for these vehicles at the time. It states, "Tethered rotorplatforms are unmanned helicopters connected to the ground station by means of a tethering cable." It goes on to define the basic advantage and mission of these types of crafts. "The main objective of tethered rotorplatforms is to elevate sensors or transmitters to an operation height at which the maximum range of these systems can be utilized without considerable restriction by terrain roughness and vegetation." "The first tethered rotor platform, that was successfully flight tested up to a height of 45 m above the ground was constructed during World War I by Stefan Petroczy and Theodore von Karman."

"It was tethered by three cables fixed at the end of three cantilevers of the fuselage and driven by three aeroplane motors of 120 hp each." Petroczy and Karman's vehicle used a pilot/observer since no electronic means of performing the flight and observation tasks was available.

A similar 3 tether system was developed during World War II, by the German AEG company. Utilizing a 200 kw (268 HP) electric motor the craft could reach a maximum altitude of 750 m (2,460 ft) AGL. Their design was intended to carry one observer or a set of radio antennas. Development was stopped before the unit ever became operational.

During the post WWII years the Hiller Aircraft Company under contract with the office of naval research, developed the Hiller VZ-1 flying platform. Tethered flight experiments starting in 1953 eventually led to successful free flight in 1955. The craft used counter rotating ducted fan, upon which the pilot stood. The craft was controlled by the pilot shifting his weight in the direction he wanted the platform to move. Variants of several sizes were produced for analysis by the US Army, which after tested concluded the craft was impractical. The Hiller VZ-1 was limited to very slow speeds and calm conditions, and would not operate very far out of ground effect.

The first notable vehicle to undergo long term development is the German build Kiebitz. After a successful predecessor program in 1972, the German military awarded Dornier a contract to build and test the Kiebitz. The system had two main components, the ground station/base vehicle and the hovering platform; these two units were attached by the large single main tether.

Even at this point in history the rotorcraft used an onboard control system to give it defacto flight stability. Some of the exhaust gas was routed through a yaw control nozzle, and was used in conjunction with an onboard analog electric autopilot unit. The craft could operate in three control modes, attitude, position, and drift control.

The main cable attaching the flight vehicle to the ground station was quite complex since it carried jet fuel up to the turbine engine, as well as many electrical cables for control signals and sensor returns. This vehicle was designed to carry comparatively large sensor arrays into the air to detect aircraft or large ground vehicles approaching a position in central Europe. Alternatively it had options to operate as a mobile relay station for radio signals on the battle field. Since there are few obstacles on the open sea, an investigation of using the system aboard ships was made. The height advantage given by the vehicle would allow detection of ships at extreme range, and could even give over the horizon capabilities.

This vehicle was considered small and portable at the time, with a weight of several hundred pounds and a vehicle diameter of nearly 5 feet. By today's standards, the craft was quite large and very heavy. The materials used to construct the vehicle, as well as the propulsion system and payloads were orders of magnitudes higher in weight than modern systems.

Some have made mention of a small electric powered platform tethered by one tether that uses active control flaps. Similar ideas can be seen in some vehicles that are being developed today. Still as can be seen by the dimensions the craft is still quite large with a rotor diameter of 2.2 m. Some desired to see tethered rotorplatforms thrive and become useful for the perceived missions, but the opposite has seemed to happen. In fact they disappeared and were replaced with complex high dollar free-flight solutions.

The French developed an elegantly designed shrouded THP, called the Nord 510. It was powered by a turboprop engine, with a blade that was 5.9 ft in diameter. The platform was able to fly and hover above the ground vehicle up to a height of 1,000 ft. The vehicle had an empty weight of 990 lb, not including the weight of fuel or the tethers at altitude. The vehicle has an approximate diameter of 6 ft and a height of 8 ft, and is not much smaller than the DO32k. The ground vehicle and attached winch systems are approximately 12 ft tall and 25 ft long.

The "Rahfan" was a ducted fan free flying vehicle that used control tabs downstream of the propeller. The designers directly commented about the instability of the aircraft, and say that the design should be tailored to "off design conditions," implying mainly to windy weather conditions. The comments allude to the conclusion that the craft is not stable in a wind gust and suffers the same instabilities as other ducted fan UAV's of similar configuration.

In the paper Development of a Shrouded-Fan UAV for Environmental Monitoring the authors say that it does not really fly at all. The Department of Aerospace Engineering at the Polytechnic of Turin in Italy developed a new ducted fan vertical takeoff and landing (VTOL UAV), where the whole vehicle is enclosed in one large shroud. The vehicle uses a large gas engine for power. Work on the project began in 1997 and the paper was published in 2004. The performance specifications are noted as such.

"The UAV, has a maximum takeoff weight of 1,000 N (224 lb), and the shroud diameter and weight are 1.9 m (6.2 ft) and 110 N (25 lb), respectively. Expected maximum performance is as follows: Scientific payload weight 100 N (24.7 lb), altitude 2,000 m (6561 ft), speed 30 m/s (67 mph), range 100 km (62 ml), endurance 2 hours."

"Unfortunately, this system can be used only for tests of relatively small duration, where the vehicle remains in a nearly horizontal attitude, that is, hovering and low speed translation. If the fuel consumption of the engines is slightly different, an unbalanced weight distribution can result on the long run. The same unbalance can also be induced by the failure of one of the engines. Finally, fuel must be provided to all the three engines in any flight condition, and this may be difficult when the tanks are only partially filled and the vehicle has a pitch attitude of more than 20 deg, as in forward flight at high speed."

The designers at the Polytechnic of Turin vehicle have not addressed any pitch back instability due to the large shroud, or issues with center of gravity placement on the vertical axis. There is also little shown on the control mechanisms, whether they are control vanes or thrust vectoring or another system as seen on current free flight vehicles.

The design is very similar to the Sikorsky Cipher. The first proof of concept Cypher was flown in 1988, with the first free flight prototype taking flight in 1993. This vehicle went through extensive testing and development throughout the 1990s and led to development of the Cypher II The Sikhorsky Cipher never reached production stage, but the program may still be active.

The Canadair CL-227 Sentinel was first developed in 1978. Development of the Sentinel progressed through three separate phases over the span of over ten years. The CL-227 is a remotely piloted vehicle with a turboshaft engine that drives counter rotating rotors. The CL-227 can operate in tethered or free flight modes. The phase three variant is roughly 5 feet tall, weighs 419 lb (190 kg), and has a payload capacity of 99 lb (45 kg). It can reach a maximum level speed of 81 mph (130 km/h) and has a typical mission endurance of 3 to 4 hours.

The Sentinel was upgraded to the CL-327 Guardian. The Guardian offers approximately 6 hours of endurance, a maximum altitude of 18,000 ft, and an increased payload capacity of 220 lb. The Guardian is equipped with state of the art radar, optical sensors, and communications equipment, and is in production by the Bombardier Company.

The paper Improving Control System Effectiveness for Ducted Fan VTOL UAVS Operating in Crosswinds optimizes what has become the standard approach in the development of hovering platform type systems. It seems from all the vehicles being developed that they want a fully autonomous self controlled and stabilizing craft. For some missions this is indeed necessary; however for relatively close-in surveillance other options exist outside this paradigm. The instability problems of ducted fan VTOL UAVs, problems still haunt even the most successful modern vehicles. "There are two significant, inherent issues associated with ducted fan control in crosswinds; 1) lateral momentum drag and 2) a duct stabilizing torque which resist tipping into the wind." The authors worked on many projects including a DARPA funded project in conjunction with Honeywell called the "Kestrel" Organic Air Vehicle.

The instabilities and control of these types of free flight craft are so complicated that in addition to the CFD models a 6 degree of freedom test model was created and wind tunnel tested. Some really substantial work was conducted and involved a lot of time and money thrown at the same problem that has existed since the first ducted fan VTOL UAV. The following four pictures show how in a strong crosswind the conventional use of control vanes is problematic as the vanes loose effectiveness unevenly due to thrust cone bending. These images also demonstrate how these control vanes should be placed very close to the rotor plane to not lose effectiveness. However, placement in such a position decreases their moment arm and thus reduces significantly their control effectiveness.

These types of instabilities, and control issues caused by insufficient control power posed large challenges to the designers and engineers working on a piloted ducted fan vehicle in the 1950's.

Aero-Design & Development out of Israel has released a vehicle extremely similar to the Hiller VZ-1 concept, now named the AD & D Hummingbird. They performed tethered flight tests starting in August of 1997, and conducted free flight testing in October of 1998. Sale of the craft in kit form was scheduled to take place in 2000, but as of May 2008 this craft is still not for sale for unknown reasons.

The state of the art free flight vehicle being deployed to Iraq and Afghanistan is the Honeywell Micro Air Vehicle (MAV). This vehicle is the product of a long term DARPA development contract whose earlier vehicles included the Kestrel and Organic Air Vehicle (OAV). "The MAV is a scout reconnaissance type vehicle. It allows people to see over a hill or around a building." The vehicle weighs 12.5 lbs, is capable of operation in 20-knot winds, and has 40 minutes of endurance at 5,500 ft. The motors, ducted fan central body and other components can be recognized.

While this free flight vehicle is capable of flying at 50 kts airspeed and climbing at 25 feet/second, the mission profile for the vehicle is described as "hover and stare". The hover and stare mission profile consists of vertical takeoff and then hovering above a place of interest providing elevated reconnaissance images. The vehicle is equipped with forward and downward looking visual and infrared camera system. The $2^{nd}$ Battalion, 5th Infantry Regiment has been undergone several months of training with the vehicle in the Military Operations in Urban Terrain training site.

BRIEF SUMMARY OF INVENTION

The invention includes the use of tethers to enable a THP to operate in adverse atmospheric conditions using inherent stability to stay aloft. Hovering platforms designed with ducted rotors or shrouded rotors are plagued with instabilities. Traditionally these types of hovering vehicles are stabilized using expensive and complicated methods. The ideal UAV of today would be capable of all weather operation while still being inexpensive, relatively easy to use, and simple to deploy. An inexpensive concept would require low-cost parts and manufacturing processes as well as a simple design. Ease of use entails minimal human interaction as well as a simple interface. Simple deployment would require an easy integration of the concept into every possible application. These types of platforms can be used in various defense and security applications, and the use of tethers could enable a THP to operate in adverse atmospheric conditions using inherent stability to stay aloft. Some of these applications include border patrol, crowd control, counter narcotics, ordinance disposal, and search and rescue.

One embodiment comprises a simple composite frame along with an engine and propeller. Since an important feature of the THP is to eliminate many of the complicated components of its predecessors the THP was built by mounting a motor fitted with an APC 5.7×3 propeller into a composite shell. The THP used for initial testing is 6 in. (15.24 cm) in diameter and 5 in. (12.7 cm) in height. The motor with its propeller can be fixed and mounted to the frame using a circular liner of polypropylene straws cut to length. The spacers allow the small motor to be mounted into the frame without significant effect on air flow and cooling around the motor. The propeller can be drilled at its center point slightly smaller than the diameter of the motor drive shaft. CA glue can be applied to the drive shaft and the propeller was pushed onto the motor. Other means for attaching the propeller to the shaft can be utilized without departing from the scope of the invention.

A small fixed rotor platform can have 3 tethers instead of 4. Consistent wobble type flight instability caused by the rotating momentum of the fixed propeller can be fixed by introducing system damping, which is an effective way to reduce the wobble instability to levels acceptable for the vehicle to perform the desired mission. Small lightweight passive dampers using a central constrained layer viscous-elastic polymer proved sufficient to provide the needed damping. The overall system design can be light weight and low cost. The weight of the sized components allowed for a platform that requires very small dampers and allows for the small inexpensive motors to provide sufficient thrust. The test platform successfully demonstrated stabilized flight in gusty conditions and also showed stable flight at a 20 ft height, although higher heights can be achieved. There is no known technology for a tethered platform that solves the stability problem, thus the use of constrained layer damping for stability is a novel invention.

The term tethered hovering platform refers to a device that hovers above a base station, to which it is attached by tethers. The vehicle is held aloft through thrust created by a propeller or propellers driven by an electric motor or motors. The propeller configuration can vary between a single propeller, counter rotating propellers, three or four propellers located co-planar. The electric propulsion can be provided by a single direct drive or geared electric motor, provided by several electric motors connected to a gear system that drives the propeller or propellers.

The device can utilize ducted or un-ducted propulsion. The platform can be attached by a single tether attached to body of the platform, or multiple tethers attached to the thrust ducting outer ring, or the body or the device or a combination of the two. Several or all of the tethers can be attached to damping devices to provide inherent stability to the platform.

The damping devices can take the form or constrained layer damping beams attached cantilever to the platform, spring mass damper fixtures, miniature hydraulic damping fixtures or other devices that add damping to the tether system. High damping fixtures may be used on the base station. The use of up-bent or pre-loaded constrained layer damping beams to provide maximum damping during flight can be utilized as a feature in the current design, allowing the dampers to deflect about a nearly flat horizontal plane in flight. The use of PZT materials attached to the dampers to test the damped and un-damped performance of the craft is seen as a new and important tool utilized in the development of this type of system and can be utilized in the field to provide real time feedback on system performance.

Reactionary flight controls can be combined with passive damping techniques to provide necessary flight envelope expansion. These include gyro reactionary turning vanes. Automated tension changing devices on the platform or on the base station that aid in stabilizing the platform. Visual signature suppression techniques are included in the vehicle design as needed. These include transparent or colored materials to reduce visual signature, color changing coatings or applications or complicated patterns to reduce visibility. Audible Signature suppression will be implemented in the design to reduce the audible signature to minimal levels when needed.

Fixed and interchangeable payloads will be flown on the platform depending on the end user requirements. Payloads include visual sensors, radio communication equipment, gas/atmospheric sensors for chemical detection and other end user defined sensors.

These and other advantageous features of the present invention will be in part apparent and in part pointed out herein below.

BRIEF DESCRIPTION OF THE DRAWINGS

For a better understanding of the present invention, reference may be made to the accompanying drawings in which:
List of Tables
Table 1—Aluminum and Copper Properties;
Table 2—Operational Cases;
Table 3—Motor Characteristics;
Table 4—Motor Thrust Test Results; and
Table 5 Summary of Calculated Flight Test Damping Coefficients

LIST OF FIGURES

FIG. 1—Depiction of Mission Possibilities;
FIG. 2—THP Fixed Camera Field of View at 50 ft;
FIG. 3—Motor Stall Torque Data;
FIG. 4—Propeller and Motor Torque vs RPM Overlay;
FIG. 5—Thrust at Each Intersection;
FIG. 6 Selected APC Propeller Weights;
FIG. 7—THP Prototype;
FIG. 8—Initial THP Test Setup
FIG. 9—THP Axis and Term Definitions;

FIG. 10—Motor Sections Showing Internal Rotating Components;

FIG. 11—Effect of Rotating Momentum on Platform Wobble Response;

FIG. 12 Effect of Damping on Platform Mean Frequency Response;

FIG. 13—Constrained Layer Damping Diagram;

FIG. 14—3M Damping Polymer Performance Comparison (Courtesy 3M);

FIG. 15—3M Damping Polymer Tape Nomograph (Courtesy 3M);

FIG. 16—Three Layer Geometric Stiffness and Loss Factor Plot (Courtesy 3M);

FIG. 17—Damper Bent Upward for Proper Flight Performance;

FIG. 18—Damper Showing Approximate Loaded Flight Shape;

FIG. 19—Dampers Test Fit Onto Platform Frame;

FIG. 20—PZT Characteristics;

FIG. 21—Effect of Damping Ratio on log Decrement;

FIG. 22—0.032" Aluminum Un-damped Beam Response;

FIG. 23—0.034" Damped Aluminum Beam Response over 10 second period;

FIG. 24—Close Up of Damped Beam Response;

FIG. 25—Undamped Platform Response, H=6 ft $V_{gust}$=6.4 mph Test 2;

FIG. 26—Undamped Platform Response, H=6 ft $V_{gust}$=6.4 mph Test 9;

FIG. 27—Damped Platform Response, H=6 ft $V_{gust}$=6.4 mph Test 7;

FIG. 28—Damped Platform Response, H=6 ft $V_{gust}$=6.4 mph Test 13;

FIG. 29—Damped Platform Response, H=20 ft Test 10;

FIG. 30—Damped Platform Response, H=20 ft Test 12; and

FIG. 31—Computer Drawing of Possible Configuration.

DETAILED DESCRIPTION OF INVENTION

According to the embodiment(s) of the present invention, various views are illustrated in FIG. 1-31.

There exists a need in many different sectors of the military or government agencies for a small, user friendly, UAV that can hover above the user and provide an eye in the sky for surveillance and situational awareness. This need is documented in a presentation released by the US Army Infantry Center at Fort Benning Ga. and a Congressional Research Services report on the Army FCS on May 2008. The current UAVs on the market have mission profiles that have them flying through remote operator control or through complex autonomous operation. For many troops operating on the ground in places such as Iraq and Afghanistan, these vehicles are being used in ways that do not utilize their full operational envelope and are performing a mission an order of magnitude simpler than they were designed. For example, solders are using fully autonomous free flight UAVs to sit and hover in one spot as a fixed eye in the sky. See FIG. 1 as an illustration of the mission possibilities.

There are several possible missions that a THP system could perform in replacement or in cooperation of other UAV systems. The THP design is not intended to replace all the functionality of the FCS Class I UAVs, instead it can operate in conjunction with other systems and due to its low cost provide soldiers at the squad level of operations increased situational awareness. These missions are discussed to provide an overview or mission possibilities as well as show how each mission contributes to the overall requirements decided upon for the THP design, but in know way limits the scope of breadth of the invention.

One embodiment of the present invention is a small inexpensive hovering platform that utilizes stability provided by a damped tether system instead of active stability through complex flight controls and that can be mounted on top of a vehicle to provide elevated reconnaissance. A THP of this design could be deployed from vehicles like a High Mobility Multiuse Wheeled Vehicle of HMMWV or a Medium Mine Protected Vehicle or MMPV or a fixed ground station and deployed to altitudes of up to 50 ft and higher. Deployment would be automated at the push of a button, and video images of the surrounding area would be streamed to the vehicle down signal wires, for viewing inside the vehicle on small monitors.

From this altitude the user could survey the tops of 2-3 story buildings, the area behind compound walls with, or behind fixed obstacles within their area of immediate interest and concern. A good example would be an army unit conducting house to house searches for insurgents or weapons deposits, another would be a stationary unit watching over a march or protest, a view from above could allow them to spot people with weapons or explosives that would normally not be visible from a low angle vantage of a large crowd. Homes with perimeter walls over 6 ft tall and up to 20 feet tall and walled off roofs provide dangerous hiding places during search and secure operations.

Peering down from an altitude even a few feet above the roof lines of these buildings clearly shows what cannot be seen from ground level. The height of a wall can typically be about approximately 8 feet, and can completely block a soldiers view. Also from ground level, people hiding on balconies or roof tops are also obscured.

While hovering above the base vehicle and providing elevated images to the ground personnel in the urban environment, the THP can also act as a limited communications relay. While this WWII mission concept showed elevating communications and radar equipment above hills and larger terrain features, the concept is still the same. The Class I &II could be used to extend the range of communication for the FCS platoon and company. The UAVs would be flown above the canopy, mountains or buildings to create better links with other small unit communications systems. This requirement fills the operational context requirement to Perform limited communications relay (narrow band, short duration) in restrictive terrain within echelon".

It is common for the perimeter of operations bases to be constantly monitored and patrolled by security personnel on foot and in vehicles. THP systems can be used to provide vehicle patrols elevated surveillance of compound perimeters. The system could also be used at fixed checkpoint locations and raised and lowered as needed. The THP also allows for checkpoint security and for "change detection". Change detection is a desired goal of the army to perch, or to land free flight UAVs on top of a building or other structure and have the vehicle operate in a fixed mode that conserves fuel and battery life. Change Detection as described by the U.S. Army Infantry Center as: "This requirement as it applies to free flight vehicles, is that the sensor requirement allows the AV to conserve on battery and fuel by "falling asleep" when perched. Change detection software coupled to the EO/IR payload would "wake up" the system once an object moved or crossed the path of the AV. The operator would be alerted with a time/date stamped still frame image. This requirement fills the operational context requirement to "Remotely over watch and report changes in key terrain, avenues of approach and danger areas open, rolling and restrictive terrain, and urban areas".

The concept of perching would be completely unnecessary for a THP, as the vehicle has an unlimited power supply coming from the base vehicle, and can stay at the operational altitude for a minimum of several hours if needed. The optical sensors could still be programmed for change detection and alert the user through the visual interface. The Army is looking at FCS Class I UAVs as well as a vehicle mounted camera system to fill this role. An FCS Class I UAV would not be optimal for this mission as it would need to be launched and pre programmed to fly the desired route. Also the operator would need to dismount from his vehicle to launch and recover the UAV. The mission need is described in more detail in a letter from the U.S. Army Maneuver Support Center at Fort Leonord Wood. "The U.S. Army Maneuver Support Center requests the following additions to the requirements for the MMPV CPD: Vehicle Mounted Optical Capability". "These capabilities enhance the ability to conduct route clearance operations". "Justification: Since the CPD was originally written, the explosives hazards threat has continued to evolve, placing soldiers in greater risk. This capability will provide soldiers the ability to survey routes at a distance greater than 300 meters forward of and to the sides (off-route) during route clearance operations. It will significantly increase the route clearance squads capability to locate and classify explosives hazards. The integration capability is requested to have 360 degree coverage to the route clearance squad while conducting route clearance operations." Height: "While the host vehicle is on a roadway it shall be capable of allowing the operator to view into second story windows, roadway surfaces of overpasses, bottom of bridges and overhead structures, as well s behind/the other side of concrete walls/fences to the height of 20 feet. In the stowed configuration, the capability shall not be higher than the host platform."

This need is currently being filled by Gyrocam Systems Pole Cam unit. The max extension height is 50 ft and the camera system weighs 65 lbs not including the weight of the extension pole. This system has a camera that is able to show very small objects at the desired 300 m range. However due to the size and cost of the unit it is not practical and available to all units. A THP is a smaller less expensive solution, with less visual capabilities but still able to provide significantly increased situational awareness and the same 360 degree view from the same height as the pole cam. These height requirements overlap with those of the needs of soldiers conducting building searches. See an illustration of a typical field of view that can be provided.

In order for the THP to be able to operate in modern combat zones of interest to the US armed forces like Iraq and Afghanistan, the most common weather conditions, as well as the extremes that can be found in these two diverse countries has been studied. While Iraq is a desert country, the yearly temperature cycle is not that different from the Midwest states in the US. Summer highs are around 97° F., and the winter lows around 31° F. The average wind speed is around 6 mph, and the humidity around 50% November through April, and around 25% May through October. All of these conditions combine to yield a favorable climate for a small electric THP to operate. Most of Afghanistan has a sub-arctic mountain climate, with temperatures that vary significantly within a single day. For example, variations in temperature during the day may range from freezing conditions at dawn to 90° F. at noon. The climate in the highlands varies with elevation; with the coolest temperatures usually occur in the mountains. Since 90-95% of the country is above 2000 m (6,500 ft), the temperature in Kabul, which is situated at an average altitude, will be analyzed. While the THP has to face a much greater short term variations in the weather conditions in Afghanistan than in Iraq the total operational envelope remains the same.

Future Combat Systems FCS program includes a broad range or technologies for the modern war fighters. Part of this system is three classes of UAVs. Class I are small UAVs designed to support small groups of soldiers on the squad or platoon levels. The Class II and III UAVs are successively larger and provide intelligence on a broader scale. Class I UAVs are intended to provide Reconnaissance, Surveillance, and Target Acquisition (RTSA) at the platoon level. Weighing less than 15 pounds each, these class I UAVs are intended to operate in urban and jungle terrain and have vertical takeoff and landing capability. They are to be used to observe routes and targets and can provide limited communications transmissions relay. The Class I UAVs are to be controlled by dismounted soldiers and can also be controlled by selected FCS ground platforms, and have endurance of 50 minutes over 8 kilometer area, and 10,500 foot maximum ceiling," While the 8 km operational would not typically be handled by a tethered system, the system can readily fulfill the rest of the FCS class I mission statement. A summary of some of the system specifications used to help determine the requirements for a THP design are summarized.

Operation in 20 kt winds

Temp 0-100 F

Endurance of 40 minutes

Operates in salt, fog, dust, and rain up to 0.5 in/hr

Noise signature of 60 dBA at 100 m

Hover and stare and perch and stare missions

Ability to Detect man size target at 250 m day and 125 m night, note these do not meet army goals Setup and launch by one person Modular and interchangeable sensors Ability to see people or objects atop three story roof tops from a position in close proximity. Maximum extension height will be 15 m/50 ft to accomplish this.

Object type and size will be defined as common hand held objects no smaller than 4 in in diameter from 200 m away, (equating to grenades, explosive devices, radios, or hand guns)

Ability to increase field of vision of personnel operating inside a HMMWV, MMPV, or similar type vehicle, giving 360° field of view Operation altitude of vehicles 0-3,000 m/0-9,000 ft MSL (From geographic information)

Operate continuously without retraction to stowed position for up to three hours a. Well exceeds 90 min duration in Extension, retraction, and stowage automatic without help beyond command inputs through user interface Stable operation at any intermediate extension distance from (0450 ft)

Continuous operation in sustained winds of 20 mph while vehicle is stationary

Continuous operation while vehicle is in motion at 20 mph

Lowest cost possible to meet platoon level budget constraints

Designed for easy replacement in the field in less than 30 minutes

Capable of lifting the mission package to meet requirements

Provide a day/night reconnaissance and security/early warning capability

Provide targetable information for LOS/BLOS engagements

Locate and recognize a man

Perform limited communications relay

Hover & Stare

Possibly Perform Chemical/Biological detection

Optional payload devices will be modular in design to allow them to be easily added and removed in a field environment with no tools Perform change detection and report changes in key terrain Deployment Storage container opens, vehicle powers up and is ready for extension Extension/Elevation Vehicle is commanded to extend to a given altitude Extension rate is fixed at 1 m/s Vehicle in Motion Vehicle deploying the THP moves locations at a max speed of 20 mph For obstacle avoidance the THP is commanded to lower itself to a shorter extension distance, and can be returned to full extension, or intermediate altitudes during operation or vehicle movement Hover The platform remains in hover providing surveillance at an assigned extension altitude Retraction When the mission is complete the THP is given the stow command and is fully retracted into the storage container at the 1 m/s rate Stowage The stowage/base station container for the vehicle will close itself in the stowing sequence to protect the craft from un-needed exposure to the environment and to provide survivability from attack.

There can be many combinations of cameras including ones capable of day/night operations as well as having Infra Red capabilities are available. Depending on final user defined visual requirements the sensor package can be modified. To have constant visual detection of a person at 250 m, with 360 degree field of view, 5 fixed cameras will be needed. A THP utilizing 4 micro cameras, orientated around the perimeter of the vehicle and one at the bottom of the fuselage pointed down would meet the requirement. Each micro camera can be about approximately 0.375"×0.375"×0.625" and weighs 0.06 oz (1.6 grams).

If constant 360 degree field of view is not necessary and only the ability to pan the sensor 360 degrees and be able to point at objects of interest is needed, then a single pan tilt sensor can be used. A custom micro pan tilt mechanism would consist of two sub micro servos 0.15 oz (4.2 grams) would be needed. Most UAV systems do not provide constant 360 degree vision to the user, they only allow for the sensors or the entire vehicle to be pointed in the direction of a potential target.

There can be various embodiments of the present design. With the present invention several unrelated and some related things can be optimized, the weight can be minimized, the cost can be minimized as well as the visible and auditory signature. It can be referred to as multi-objective design optimization problem. The objectives include minimization of such things as weight, cost, overall size and the acoustic signature of the vehicle. The importance of each of these variables is defined by the desired operational scenario and end user. However without a customer to dictate desired weighting of these objectives the initial effort will focus on the lightest weight craft. The objective of minimizing the weight will be constrained with the maximum RPM the propeller can withstand, the power handling capability of power wire, the fixed weight of the desired mission package, the desired gust velocity or vehicle velocity for the operational environment, and the height that the vehicle is to operate at. Since the vehicle can use a fixed pitch blade and hovers, the sizing equations used for hovering helicopters can be utilized for analysis.

The figure of merit refers to the amount of power that goes to drag of the propeller, the rest going to thrust, creating a ratio between induced power and actual power, which is the figure of merit (F.M.) for a hovering helicopter M=0.75. For smaller scale 0.7 seems to be the max. The figure of merit can be maximized by optimizing the area, twist, and airfoil type, however without a custom designed propeller the THP can have the F.M. of the available props.

$$P_{aero} = T \cdot V \qquad 3.1$$

$$P_{shaft} = \frac{T \cdot V}{M} \qquad 3.2$$

$$F.M. = \frac{T}{P_S}\sqrt{\frac{T}{2\rho A}} \qquad 3.3$$

$$P_S = \frac{T^{\frac{3}{2}}}{(F.M)R\sqrt{2\rho\pi}} \qquad 3.4$$

The range for figure of merit is $0.4 \leq M \leq 0.7$ because thrust is not equal across the propeller, highest near the middle and 0 at the hub and outer frame. In a hovering craft the weight directly influences the thrust required, the thrust dictates the propeller size which can be narrowed down to a diameter pitch region able to produce the required thrust. The propeller diameter and pitch dictate a torque and power required region for the motor. The greater of the thrust value to give the proper disc loading or about T/W=2 is needed, one to resist the gust the other to provide tension in the lines.

$$V_i = 2V_{Gust} \qquad 3.5$$

$$V_i = \sqrt{\frac{T}{2\rho A}} = 2V_{Gust} \qquad 3.6$$

$$V_{i_{min}} = 2 \cdot \sqrt{\frac{T}{2\rho A}} \qquad 3.7$$

$$V_i^2 = \sqrt{\frac{T}{2\rho A}} = 4V_{Gust} \qquad 3.8$$

$$DiscLoading = \frac{T}{A} = 8\rho V_{Gust}^2 \qquad 3.9$$

Using these equations the required thrust for the vehicle is determined. With this value then propellers capable of producing that thrust can be selected. With the mission package as a fixed weight, and the weight of the tethers plus the weight of power and control wires a first total weight estimate can be made. The pitch of the propellers in consideration as the needed component can decide the torque needed from the motor and this relationship can decide the operational maximum rpm available at the motors maximum rated voltage. An optimum combination of custom designed motor matched with a custom designed propeller does exist but non custom component can be used. It is possible to use the known values in combination of minimizing the weight with the help of constraints to reach a design space where feasible combinations of motor properties and propeller properties yield feasible THP designs, this design space could be further reduced by complicated design of the propeller and motor to reach a single optimum design for a given mission package and desired acoustic signature.

The THP needs a small powerful electric motor. In one embodiment of the present invention a brushless DC motor can be used. The main requirements of the motor are:

An operational voltage that matches available power supplies

Maximum RPM that matches available propellers

Low operational current draw that will result in as small a gauge power wire as possible Power to weight ratio as high as possible However, alternative embodiment can include Other motors can be used including AC motors and Brushed DC Motors without departing from the scope of the invention. However a brushed DC Motor is easier to be maintained, the noise problem due to the wearing out of the commutator is eliminated and the motor itself is much lighter than the BDC motor.

The motor can stay within the range of about 15-25 W, while the average weight can be around 60 grams. However there can be an output that is up to 70 watts, while the weight stays in the same range of the less powerful motors only producing 10-30 watts of power.

The length of the wires that tether the platform and the material that will be used is part of the design. The operational environment may impact this decision, therefore, one embodiment may have about approximately 50 ft cables (approx. 15 m).

TABLE 1

Aluminum and Copper Properties

|  | Cu (ohm-m) | Al (ohm-m) |
|---|---|---|
| Specific Resistance (ohm-m) | $1.72e^{-2}$ | $2.82 \times 10^{-2}$ |
| Density (kg/m^3) | 8890 | 2700 |
| Melting point (C.°) | 1083 | 652 |
| Specific heat, 20° (J/kg*K) | $0.39e^3$ | $0.88e^3$ |
| Linear expansion coefficient | $16.8e^{-6}$ | $23.6e^{-6}$ |
| Tension strength (N/m^2) | $24e^7$ | $16e^7$ |
| Elongation (%) | 38.5 | 6 |

Aluminum has low resistivity, fourth behind gold, copper, and silver). On the other hand copper is cheaper than aluminum, which is very beneficial for this design, and has a lower resistivity than aluminum, which explains why it is used most often as wiring. Aluminum is lighter than copper, and has much chance for elongation. Combined with its light weight and alloyed with some other metals to make it stronger, aluminum becomes ideal for electrical cables. Its non-magnetic properties allow it to operate anywhere. It is strong, can easily be transported, and has a low resistivity, thus making it the best choice for high power, long distance, electrical cables. The THP will not require very long wires, so the specific conductivity of the Aluminium does not influence the choice. With the copper wires a smaller gauge can be used, since the conductivity is higher, and since the heat generated with the copper is not as high as that from the aluminum wire. This will result beneficial for the final weight of the THP.

For each motor the minimum wire gauge can be found, and from the gauge all the dimensions and weights can be calculated. First the dimension in inches was can be found, then in circular mils, so that the weight in lb could be determined, and then converted into grams. The weight takes into account the whole length of the wires, 50 ft (15 m). Even through wire as thin as 31 gauge can handle the power needs of the motor, a 27 gauge minimum wire size can be chosen to allow for a safety factor in the design and durability while in flight. See FIG. 10 for an illustration of the parts of a motor.

Since the thrust is dependent on the pitch, the first set of propeller will only vary in diameter. A diameter range of about approximately 5.7" to 10" can be chosen. Among other variables, thrust is directly dependent on is the RPM, so different RPM values will be studied. A range from about approximately 5,000 to 18,000, with a step interval of 3000 can be chosen. The value 18,000 can be chosen because it is the highest RPM No Load found in all of the motors, and under load the max RPM will decrease from there. By means of Java software THRUSTHP program (Ref. 35), the thrust and the power of each motor, at different RPM can be computed. The thrust is also dependent on the air pressure, measured by inches of mercury in a standard gauge.

TABLE 2

Operational Cases

|  | Altitude m | Altitude ft | press in Hg | Temp C. | Temp F. |
|---|---|---|---|---|---|
| Case 1 | 600 | 1970 | 28.07 | 49 | 120 |
| Case 2 | 1800 | 5900 | 23.2 | −31 | −23 |

Different pitches of the propellers can also be taken into account, since the thrust also depends on the pitch of the propellers. RPM maximums are taken into consideration, since the thrust obviously depends on the RPM. Numbers displayed in the table are the thrust in lb, found using the THRUSTHP software. Each motor has a designed stall torque where it will not spin any faster, this stall torque will limit the max rpm of each motor/propeller combination. Because of this the torque will be analyzed, so that it will possible to look at the performance of each motor and propeller pairing.

From the power in Watts it is possible to compute the torque:

First the RPM needs to be converted to RPS:

$$\Omega(\text{rad/s}) = \text{RPS} \cdot 2\pi \qquad 3.4.1$$

Then the Power needs to be converted from HP to W by a factor 745.7:

$$P(w) = P(\text{hp}) \cdot 745.7 \qquad 3.4.2$$

Then the torque Q is found dividing the Power by the RPS:

$$Q = P/\Omega(\text{rad/s}) \qquad 3.4.3$$

Finally the Torque Q, for each different propeller, at a varying RPM, can be calculated. While in FIG. 3 one the torque against the RPM for each motor is shown. In FIG. 4 the torque for each APC propeller are displayed with respect to the different RPM. These can be overlaid to find curve intersection points that will identify the max rpm each motor is capable of turning the different propellers. See FIG. 5 for an illustration. The intersection between each APC Propeller torque curve and the torque line of the Johnson motor will be found so that the RPM which maximizes the thrust can be extrapolated.

With the mission package and other weight estimates known the thrust required to meet the TW≈2 the thrust required is about 0.65 lbs, the minimum diameter for the propeller to produce the required thrust for a THP is about 7". Due to propeller motor matching results, propellers with a large diameter (9" or 10") will result in larger thrust to weight ratio, but will also have some influence on the weight and size of the platform. A 7" propeller for electric motors weighs 0.3 oz (8.5 grams), while a 10" APC weighs 0.75 oz (21.3 grams). See FIG. 6, which is a graphical illustration of the APC propeller weights. If the acoustic signature of the 7" propeller turning at around 10,000 RPM is decided to be too high, a 10" propeller turning at 5,200 RPM can be used increasing the weight but reducing the acoustic signature.

TABLE 3

Motor Characteristics

| Name | Johnson HF283LG BP03031 |
|---|---|
| Voltage [V] | 24 |
| Amperage max [A] | 5.4 |
| Watts [W] | 70.5 |
| RPM max | 13,500 |
| Weight [g] | 35.5 |
| Motor's Weight + Wire's Weight [g] | 84.51 |
| Watt/Weight [W/g] | 1.98 |
| Thrust (at RPM max and 7" propeller) [lb] | 2.19 |
| Torque [mN-m] | 158.2 |

For test and proof of concept, several platform designs were mounted on a plywood platform and set at the widest gait available, (64 in. or 162.56 cm) and then observed in normal flight. See FIGS. 7 and 8 for an illustration of THP prototype and test setup. Disturbing forces were created on each craft by tapping the outer frame during flight. The original flight tests were conducted with four equally spaced tethers. A four tethered vehicle can have some variance in the lengths of each of its tethers, leaving one line always slack. The variance in the lengths of the tethers can produce uneven distribution of tension on each of the lines. Uneven tension in the stay lines can add to the crafts instability instead of decreasing it.

Dealing with three tethers can simplify and strengthen the stability of the THP. The three tether design eliminates the problem of having diametrically opposed lines which have different net tensions. The varied gaits experiment provides observational results about how the varied gait angle of the tether lines affects the stability of a tethered hovering vehicle in controlled conditions. The THP becomes increasingly stable as the gait is increased outward from a central point. The control of the turbulence on the THP environment can ensure any instability observed in the craft is not contaminated. The height of the THP is kept at a constant 3 ft (1.0 m). The height can be kept constant due to the fact that in theory all the different heights that can be achieved by the craft can be simulated by varying the gaits. Between each data collection the gait is varied by four inches until the 32 in (0.81 m) mark is reached.

The testing base was constructed from a 4 by 4 ft. (1.219 m.) plywood sheet. Two lines are drawn on the 4×4 foot section by drawing the line from one corner of the piece to the opposing corner of the piece, the end result of this being an X. The positions for the eyebolts were marked by starting from the vertex of the X on the plywood and drawing marks at 4 in, (10.16 cm) intervals. At each vertex of the marked out line a hole was drilled completely through the plywood to accept the eye-bolts. A total of seven eye-bolts were mounted on each side of the center point allowing that the gait to be varied seven times. The test was performed by measuring the angle of deflection from the vertical and horizontal axis. The THP was initially mounted at the outermost eye-bolts which created a gait with a diagonal of 64 in. (162.6 cm). The THP was then flown with zero wind current to find a control for the deflection angles to be measured from. A 5 mega-pixel camera was used to record the control and variable data. After the control shot was taken, the fan was turned on and the air velocity measured at the THP was 13.3 ft/sec (4.065 m/s). A photo was then taken of the craft at the new position with respect to the wind current. This process was then repeated at each gait and the results were graphed.

The un-ducted thrust test was designed to gather data on the THP engine. The motor testing stand used was fabricated using 0.15 in. (0.381 cm) by 0.4 in (1.02 cm) rectangular steel. The motor testing stand was attached to a local table. The engine was then mounted on the side opposed to the scale. After the engine was mounted, power was supplied and two multi-meters were attached to the lines to measure the amperage and voltage.

The voltage supplied to the motor is varied from 0-30 in 2 volt increments, allowing the power supply to automatically balance the current. The grams measured by the scale were recorded at each interval. The motor was given five minutes to cool and then the test was repeated starting from 30 volts and going to 0 volts in increments of 2. The motor was again given five minutes to cool and the test was repeated a third time starting form 0 volts and going to 30 volts in increments of 2. The grams from each interval were then averaged together to get an accurate measurement of thrust.

TABLE 4

Motor Thrust Test Results

Un-ducted Engine Data

| Prop: | APC 5.7 × 3 | |
|---|---|---|
| Motor: | GEE GCR3 | |
| Volts: | Current: | Actual Thrust Produced in Grams: |
| 2 | 0.1 | 0 |
| 4 | 0.2 | 0 |
| 6 | 0.3 | 4 |
| 8 | 0.4 | 14 |
| 10 | 0.6 | 30 |
| 12 | 0.8 | 44 |
| 14 | 1.0 | 58 |
| 16 | 1.2 | 78 |
| 18 | 1.4 | 94 |
| 20 | 1.6 | 110 |
| 22 | 1.8 | 132 |
| 24 | 2.0 | 144 |
| 26 | 2.2 | 154 |
| 28 | 2.5 | 164 |
| 30 | 2.8 | 182 |

The THP was then mounted to a base using three tethers, attached directly to the cabin frame. Although the instability was present, under low disturbance lab conditions flight up to 9 ft (3 m) was possible. The purpose of these initial tests was to investigate the possibility of a practical and reliable Tethered Hovering Platform and to show the angles at which the craft is deflected when a cross-wind is applied. The effectiveness of the methods were proven conclusively by the construction of a tethered vehicle and the testing at various deflection angles. The angle of deflection of the craft was thoroughly tested in a cross-wind of 4.065 m/s. The gaits were varied from 64 to 16 in. On the horizontal axis, and pitching angle varied from 0° to 7.9°. The results of these tests showed that as the gaits are decreased, the angle of platform response increases. Therefore, to create an efficient THP with a manageable gait, the instability problems must be countered. See FIG. 9 for THP axis and term definitions.

The THP can be a dual spin system, defined as a system with one component that rotates about a fixed body axis, and one that remains stationary. For the THP the propeller can rotate about the body Z axis, where as the body of the vehicle it self stays stationary in its on body axis system. The angular momentum caused by this rotation can cause a stabilizing effect as well as a wobbling precession or destabilizing effect. See FIG. 11 for a graphical representation of the effect of rotating momentum on platform wobble response.

Through analysis of the momentum effects of the propeller the precession frequency can be found and proper damping introduced to the system to cancel the undesired side effects of the rotational motion of the propulsion system. The THP body can be rigid in the system and therefore is represented by R, the propeller is the moving component and can have the designation B, stemming from the use of rotating momentum as a stabilizing bias to the system. Defining the principal inertial axis for R and B, as well as R+B, as they are part of the same system. We denote the inertial angular velocity of the THP component R as $\vec{\omega}$. The Propeller is symmetric about the spin axis, as it is assumed to be balanced; its inertia is denoted as $\bar{I}_B$ and has an angular spin rate of $\Omega_B$ with respect to the main platform R, whose own inertia is denoted as $\bar{I}_R$, both inertias about the $b_3$ axis, Z axis, which is fixed in R, and in our specific case also fixed in B. The inertial angular velocity of B can be written as $$\vec{\omega}_B = \vec{\omega} + \Omega_B \hat{b}_3 \qquad 5.1.1$$

The systems total angular momentum about its center of mass can be written as $$\vec{h} = \bar{I}_R \cdot \vec{\omega} + \bar{I}_B \cdot \vec{\omega}_B \qquad 5.1.2$$

If we define the net external torque disturbances on R+B about its center of mass as $$\vec{\tau} = F^T \tau, \tau = \begin{Bmatrix} \tau_1 \\ \tau_2 \\ \tau_3 \end{Bmatrix} \qquad 5.1.3$$

And the rotational equations of motion for R+B in vector form take shape as, $$\vec{\tau} = \dot{\vec{h}} = \frac{d}{dt}(\vec{h})_F + \vec{\omega} \times \vec{h} \qquad 5.1.4$$

Re writing the vector form in scalar form for the principal inertia coordinates, (x, y, z)=(1, 2, 3)

$$\tau_1 = I_1 \dot{\omega}_1 + \omega_2 [h_B + \omega_3 (I_3 - I_2)] \qquad 5.1.5$$

$$\tau_2 = I_2 \dot{\omega}_2 - \omega_1 [h_B + \omega_3 (I_3 - I_1)] \qquad 5.1.6$$

$$\tau_3 = I_3 \dot{\omega}_3 + \dot{h}_B + (I_2 - I_1) \omega_1 \omega_2 \qquad 5.1.7$$

These equations if the angular momentum introduced by the spinning propeller $h_B$ is zero, then the above equations reduce to rigid body Euler equations.

The terms $\omega_2 h_B$ and $\omega_1 h_B$ in the Roll (1) and Pitch (2) axis represent the internal gyroscopic torques due to the propeller bias momentum. In the yaw axis however only the reactionary torque $\dot{h}_B$ due to the angular acceleration of the propeller. If the propeller surges or has an unsteady RPM a rotation disturbance about the Z axis can occur. However since the platform will operate at a constant power setting assuming the propeller spins at a constant rate is a very close assumption, such that, $$|\dot{h}_B| = 0 \qquad 5.1.8$$

Also due to the low weight of the carbon fiber airframe combined with the fact that the frame is kept nearly stationary, the bias momentum introduced by the propeller and rotating components of the motor dominates the system, where $$|h_B| = \max(|(I_3 - I_2)|, |(I_3 - I_1)|) \bar{\omega}_3 \qquad 5.1.9$$

With these two simplification the dynamics equations can be written in approximate.

$$I_1 \dot{\omega}_1 \approx -\omega_2 h_B + \tau_1 \qquad 5.1.10$$

$$I_2 \dot{\omega}_2 \approx \omega_1 h_B + \tau_2 \qquad 5.1.11$$

$$I_3 \dot{\omega}_3 = -(I_2 - I_1) \omega_1 \omega_2 + \tau_3 \qquad 5.1.12$$

If we don't make the two above simplifications and alternatively assume very small angular velocities where $\omega_{1,2,3} = 1$ then equations 5.1.5-7.1.7 simplify to $$I_1 \dot{\omega}_1 \approx -\omega_2 h_B + \tau_1 \qquad 5.1.13$$

$$I_2 \dot{\omega}_2 \approx \omega_1 h_B + \tau_2 \qquad 5.1.14$$

$$I_3 \dot{\omega}_3 = \tau_3 \qquad 5.1.15$$

It is noted that the roll and pitch equations come out the same, so without assuming any small angular velocities the roll and pitch dynamics are described by exact linear equations as long as the bias momentum introduced by the propeller dominates. If this is not the case then an approximate linear equations can be found through making small angular velocity assumptions. In the case of the THP making this assumption is unnecessary since the propeller momentum dominates, however it has also been observed that the angular velocities are very low, so making this assumption would also be a valid course.

Knowing that the pitch and roll motion is independent of the yaw it will not be considered in the dynamic analysis, thus simplifying the expressions.

$$\begin{Bmatrix} \dot{\omega}_1 \\ \dot{\omega}_2 \end{Bmatrix} \approx A \begin{Bmatrix} \omega_1 \\ \omega_2 \end{Bmatrix} + B \begin{Bmatrix} \tau_1 \\ \tau_2 \end{Bmatrix} \qquad 5.2.1$$

Where $$A = \begin{bmatrix} -\frac{c_1}{I_1} & -\frac{h_B}{I_1} \\ \frac{h_B}{I_2} & -\frac{c_2}{I_2} \end{bmatrix}, B = \begin{bmatrix} I_1^{-1} & 0 \\ 0 & I_2^{-1} \end{bmatrix} \qquad 5.2.2$$

$C_1$ and $C_2$ are viscous damping coefficients introduced to represent the physical damping during the precession/wobble motion, described by their respective frequencies $\omega_1$ and $\omega_2$. This damping will be implemented passively through the constrained layer damper attachments between the platform and the tethers. See FIG. 12 for an illustration of the effect of damping on platform mean frequency response.

$$\begin{Bmatrix} \omega_1 \\ \omega_2 \end{Bmatrix} = G(s; h_B) \begin{Bmatrix} \tau_1 \\ \tau_2 \end{Bmatrix} \qquad 5.2.3$$

Defining the terms further:

$$G(s; h_B) = \frac{1}{\Delta(s)} \begin{bmatrix} \frac{s}{I_1} + \frac{c_2}{I_1 I_2} & -\frac{h_B}{I_1 I_2} \\ \frac{h_B}{I_1 I_2} & \frac{s}{I_2} + \frac{c_1}{I_1 I_2} \end{bmatrix} \quad 5.2.4$$

The denominator of the coefficient expands, $4(s)=(s-\lambda)(s-\lambda^*)$ (eqn 5.2.4) where the complex conjugate eigenvalue pair is parameterized in the familiar and textbook form for a second order vibratory system involving the damping ratio $\zeta$ and frequency $\omega_0$ $$\lambda, \lambda^* = -\zeta\omega_0 \pm j\omega_0\sqrt{1-\zeta^2} \quad 5.2.5$$

With, $$\zeta = \frac{1}{2\omega_0}\left(\frac{c_1}{I_1} + \frac{c_2}{I_2}\right) = \frac{1}{\sqrt{1+\frac{c_1 c_2}{h_B^2}}} \zeta_m \quad 5.2.6$$

$$\zeta_m = \frac{1}{2}\left[\sqrt{\frac{I_2}{I_1}}\left(\frac{c_1}{h_B}\right) + \sqrt{\frac{I_1}{I_2}}\left(\frac{c_2}{h_B}\right)\right] \quad 5.2.7$$

$$\omega_0 = \lambda_0 \sqrt{1 + \frac{c_1 c_2}{h_B^2}} \quad 5.2.8$$

$$\lambda_0 = \frac{h_B}{\sqrt{I_1 I_2}} \quad 5.2.9$$

In the last equation 5.2.9 $\lambda_0$ is the un-damped precession frequency of the system, it can be seen that the damped frequency (eqn. 5.2.8) reduces to the precession frequency equation (5.2.9) if the damping is zero. Also the frequency increases linearly with an increase in bias momentum/propeller momentum, and is inversely related to the rotational inertia of the body mass. This makes sense since a body at rest tends to stay at rest and the higher the body inertia the more it will resist the effects of the spinning inertial mass. More examination of the effects of damping is needed, since passive damping is the intended solution to the precession/wobble problem seen in the initial testing, and predicted by the momentum equations.

$$\zeta = \frac{\frac{c}{h_B}}{\sqrt{1+\left(\frac{c}{h_B}\right)^2}} \frac{1}{2}\left[\sqrt{\frac{I_2}{I_1}} + \sqrt{\frac{I_1}{I_2}}\right] \quad 5.2.10$$

if $c_1 = c_2 = c$ $$= \frac{\frac{c}{h_B}}{\sqrt{1+\left(\frac{c}{h_B}\right)^2}} \quad \text{if } c_1 = c_2 = c, I_1 = I_2 = I \quad 5.2.11$$

$$\approx \frac{c}{h_B} \text{ if } \left|\frac{c}{h_b}\right| = 1 \quad 5.2.12$$

So for small damping ratios the system damping can be assumed to take the form of equation (5.2.12).

At this point the vehicle parameters can reduce the equations further if the momentums are known. Also, for given momentum levels a plot of the effect of damping can be created to size the damping. The THP design involves the inverse of this exercise where there is a known set of momentums, and a designable damping ratio.

The present invention concentrates on shear deformation as it is suited to the application.

The Ross-Kerwin-Ungar Equations best analyze the behavior of the damping treatments.

The flexural rigidity of the three layer system, EI, is described as;

$$EI = E_1 \frac{H_1^3}{12} + E_2 \frac{H_2^3}{12} + E_3 \frac{H_3^3}{12} - E_2 \frac{H_2^2}{12}\left(\frac{H_{31}-D}{1+g}\right) + E_1 H_1 D^2 + E_2 \quad 6.1.1$$

$$H_2(H_{21}-D)^2 - \left[\frac{E_2 H_2}{2}(H_{21}-D) + E_3 H_3(H_{31}-D)\right]\left(\frac{H_{31}-D}{1+g}\right)$$

Where:

$$D = \frac{E_2 H_2(H_{21} - H_{31}/2) + g(E_2 H_2 H_{21} + E_3 H_3 H_{31})}{E_1 H_1 + E_2 H_2/2 + g(E_1 H_1 + E_2 H_2 + E_3 H_3)} \quad 6.1.2$$

$$H_{31} = \frac{(H_1 + H_3)}{2} + H_2 \quad 6.1.3$$

$$H_{21} = \frac{(H_1 H_2)}{2} \quad 6.1.4$$

$$g = \frac{G_2}{E_3 H_3 H_2 p^2} \quad 6.1.5$$

This analysis holds for simply supported beams and plates. Beam equations: To use the RKU analysis to predict the damped response of simply supported beams it is sufficient to denote the natural frequency as, $$\omega_n = \frac{\xi_n^2}{L^2}\sqrt{\frac{EI}{\rho H b}} \quad 6.1.6$$

Where the nth eigenvalue is, $$\zeta_n = n\pi \quad 6.1.7$$

In detailed design, the change in flexural rigidity and predicted damping response of individual damping beams can be combined with flight test results to predict damper dimensions.

There are several parameters considered in the present invention to design a constrained layer damper system. First is the thickness, width, length and material of the constraining layers. Aluminum can be chosen due to its light weight, good corrosion resistance, and its flexibility. For example, 2027-T3 aluminum, although other metals could be utilized. The thickness of the aluminum was determined to ensure that sufficient strength and stiffness exists under operational flight loads. The 3 aluminum cantilever beams have to be stiff enough not to give way to the flight forces, yet flexible enough to bend during perturbations in flight, therefore allowing the viscoelastic layer to absorb the energy of the disturbance. A minimum thickness of 1 mil. or 0.001" viscoelastic tape is available from 3M. This can be combined such that the thickness ratio of the constraining layer to damping medium layer be between 20:1 and 50:1, to yield a thickness of each aluminum constraining layer between 0.010 to 0.025. Viscoelastic damping polymer comes in thicknesses up to 0.010" thick for much larger applications, it is seen that a thickness of 1-2 mils will be sufficient for the tethered platforms dampers. Sheet aluminum is available in several standard thicknesses, with in-between sizes requiring custom rolling to thin down to the desired thickness. The available sizes locally were 0.016", 0.020", and 0.025". Due to the THPs small size the 0.016" thick aluminum was chosen and the dimensions of the dampers were designed from cantilever beam theory, and tested in the lab to confirm reasonable deformation under flight conditions and cyclical bending under THP disturbance.

There are several different polymers offered with slightly different performance specifications, see FIGS. 14, 15 and 16. Using the operational temperature, thickness, and performance plots 3M VHB Adhesive Transfer Tape 9460 was chosen. All of the polymers and tapes perform well in the frequency range seen by the oscillations of the THP, 1-3 Hz approximately. However VHB tape 9473 is a 10 mil tape, and VHB tape 9469 is a 5 mil tape, both most likely too thick for the small dampers needed for this application. Viscoelastic Damping Polymer 110 also comes in a 2 mil thickness, and is good for higher temperature applications up to 100 c depending on the frequency of the application. VHB transfer tape 9460 and VDP 110 have comparable performance at room temperature approximately, 70° F. To better cover the whole operational temperature spectrum from 0 deg F. to 100° F. a combination of the two materials could be used. For one embodiment only one material, VHB transfer tape 9460 was utilized in sample form for testing from 3M, and was therefore used in the testing prototype.

Typical Relative Performance Data: Two Point Bending Vibration Test (From 3M Datasheet). A two point bending test is a means to compare the relative damping performance of a 3M damping polymer in a three layer laminate design. A system "laminate loss factor" can be determined. The laminate loss factor can allow the 3M™ Viscoelastic Damping Polymer 110 and 3M™ VHB™ Adhesive Transfer Tapes 9460, 9469 and 9473 to be compared to one another for their relative performance at that specific test frequency, temperature and laminate dimensional design. The two point bending data and the polymers nomograph may be used to predict the general performance range for Viscoelastic Damping Polymer 110 and VHB Adhesive Transfer Tapes 9460, 9469 and 9473 relative to each other at higher frequencies in a similar laminate construction design. A general extrapolation to higher frequencies, which would shift the temperature scale on the existing 2-point test graph, can be done by estimating from each polymer's nomograph the shift in temperature (delta) that occurs when the polymer goes from the two point test frequency (ex: 10 Hz) to a higher frequency that the damping polymer may be exposed to in a similar but higher frequency application. The temperature shift is found by maintaining the same Loss Factor (Ex: LF=1.4 @ 10 Hz & 50° C.) and shifting the frequency to the desired level (Ex: from 10 Hz to 1 KHz) and determining the temperature delta (Approximately 40° C. for Viscoelastic Damping Polymer 110). Nomograph Description (From 3M Datasheet)

The 3M™ Viscoelastic Damping Polymer 110 and 3M™ VHBrM Adhesive Transfer Tapes 9460, 9469 and 9473 damping properties are shown in the "reduced temperature format" nomograph. The nomograph shows the viscoelastic damping polymers Loss Factor and Storage Modulus for various frequencies and temperatures in a single graph. The Shear (Storage) Modulus and Loss Factor are intensive properties of the viscoelastic damping polymer alone. The Loss Factor and Storage Modulus are the key measurement parameters and determine the level of potential damping capability that exists in the Viscoelastic Damping Polymer 110 and VHB Adhesive Transfer Tapes 9460, 9469 and 9473 at a specific temperature and frequency. The Loss Factor and Storage Modulus are found for the Viscoelastic Damping Polymer 110 and VHB Adhesive Transfer Tapes 9460, 9469 and 9473 by selecting the frequency desired of an application and extending a horizontal line from that frequency until the desired application temperature isotherm is intersected. Extend a vertical line from this first intersection point of the desired frequency and temperature isotherm so that it intersects the Loss Factor and Storage Modulus curves. The Loss Factor and Storage Modulus values are found on the left hand scale by extending a line horizontally from these second intersection points on the Loss Factor and Storage Modulus performance curves.

One preferred configuration is to have equal thickness constraining layers. Combined with a thin layer of viscoelastic material the highest loss factor will be achieved. Using 0.016 aluminum sheet, with 0.002" thick VHB tape, the fraction of total thickness in one metal layer becomes 0.016/0.034 or 0.47. This can be seen graphically in the chart.

In many applications of the VHB Adhesive Transfer Tapes 9460, 9469 and 9473 to a constraining layer or substrate the 3M Adhesive Transfer Tape need only pressure to provide adequate bonding at room temperature 70° F. (21° C.). For an acceptable bonding of the Viscoelastic Damping Polymer 110 and VHB Adhesive Transfer Tapes to a surface, it is necessary for surfaces to be dry and free of any wax, grease, dust, dirt, oil, scale or any other contaminants or loose or weakly attached surface finishes or coatings. The importance of contamination free surfaces cannot be over emphasized. Typical cleaning solvents like isopropyl alcohol can be used. 3M abrasive pad was used to clean and prepare the surface of the aluminum strips.

Applying the transfer tape to the aluminum strips is a very delicate and precise process that must follow these steps. The VHB Adhesive Transfer Tape polymers are tacky at room temperature 70° F. (21° C.). The VHB Adhesive Transfer Tapes polymers require only rolling to apply pressure to the 3M polymer to make an adequate bond to a contamination free surface, a small aluminum cylinder 2 inches in diameter was used for this task. Air entrapment was avoided to ensure a good bond. The strips of aluminum were sandwiched by starting at one edge of the damping material and substrate, then gradually lower the damper onto the surface while continually applying uniform pressure to the damper. The VHB Adhesive Transfer polymer bond will typically build with time or exposure to higher temperature. After the curing cycles involved in mounting the PZT sensor chips the polymer bond was very strong. The Viscoelastic Damping Polymer 110 is relatively tack free at room temperature 70° F. (21° C.).

Temperatures above 250° F. (121° C.) should be avoided, so the curing temperature for all PZT bonding processes were kept at or below this temperature. The bonded dampers were bent into the calculated shape and then mounting holes were machined into the dampers at the root. The up angle created by the bend creates a preload condition in the damper, see FIGS. 17, 18 and 19. When subjected to the nominal thrust load of the THP in flight the damper will bend down back towards horizontal. The bent damper will therefore bend about horizontal as the platform moves, this is essential for maximum damping. If the damper would be horizontal before flight the damper would then be bent down below horizontal and the amount of strain in the damper would be reduced. Design of the dampers to deflect about the horizontal, this is deemed pre-loading of the dampers. The dampers are pre-bent upward the same amount as the pull force in steady flight will be. This will be opposite of the tension force. This allows the dampers to bend about a neutral point and gives the most damping. The thrust is calculated and the weight of the craft and tether system subtracted. The remainder is divided by 3 and becomes the tip force for bending calculations. The downward deflection due to the residual thrust is calculated through simple cantilever beam bending theory.

$$\delta_{max} = \frac{Pl^3}{3EI} \qquad 6.3.1$$

The residual thrust in the test platform is 6 oz, leaving 2 oz of force at the tip of each damper. With 6 inch dampers this corresponded to a pre bend of 4 inches. This pre bend was confirmed to be very accurate in flight, as the tip of the dampers were even to the naked eye with the root of the dampers where they were attached to the THP frame. Without this pre-bend a cantilever damper may bend down in flight leaving the tip of the damper below the root of the beam. This could cause two effects that are undesirable. First the dampers would not bend as much under platform disturbance, and the dampers would be more aligned with the tethers, causing some of the force to be transmitted down the length of the damper pulling the platform instead of pulling the damper down in bending. By having the dampers level in flight disturbances to the platform that are resisted by the tethers cause maximum bending in the dampers and thus dissipate maximum energy through shear of the viscoelastic material. Depending on THP weight, damper size, thrust levels, and damper construction this angle will need to be re-calculated.

PZT chips were chosen to provide damping test results, the extremely low weight and low interference made this solution ideal, see FIG. 20. Heavy accelerometers placed at the ends of the damper elements would destroy the system and any results attained. With the small size and thrust of the demonstration vehicle a system using accelerometers was investigated and weighed 3-5 oz with all included wiring at a 6 foot height. This would mean the system would be weighed down and the spare thrust needed to keep the tether lines taught would be negated and the test would not yield good results. It is not known that this technique has ever been used to attain damped flight characteristics.

Small chips of PZT 5A were cut to fit on the dampers. The PZT edges were carefully sanded and inspected to ensure low defects. The chips were cleaned with isopropyl alcohol. Three sets of dampers and several spares were produced. The PZT chips were placed near the root of the dampers, at the same time enough of a distance away as to see bending motion in the beam at low tip deflections. The PZT was secured to the damper beams using EP21 DC/NFL conducting epoxy, this allowed the aluminum substrate of the damper to act as the base conductor for the PZT element. The PZT was cured in an over at 250 F for 3 hours. The dampers with PZT elements attached were then outfitted with 25 ft long lead wires. The wire used was 32 gauge motor wire. This arrangement yielded negligible weight. The total weight added to the system was approx. 45 grams 1.5 oz at 20 ft. At 6 ft where a lot of testing occurred the total weight was approx. 13 grams. This weight is a small fraction of an accelerometer based measurement system. Proper results would not have been possible without the PZT sensing solution. These damper sets were interchanged on the same platform to compare results. The dampers with the sensing elements remain intact and usable for further testing.

The individual dampers were tested to determine the increase in damping coefficient. A computer with Labview and a National Instruments USB data acquisition box is used. The damper was mounted to a large, perfectly flat table top fixture called an optical mounting plate. This type of plate is designed to bolt measurement equipment down to an almost perfectly flat surface. This provides the ideal interface to test the aluminum dampers. The dampers were fabricated following, the ASTM standard to measure damping coefficient in long thin beams. The damper was mounted between two aluminum blocks that were bolted to the optical mounting plate. Under the end of the damper another aluminum block was placed under the tip to create an 8 mm gap instead of the 20 mm gap that would have been there without the spacer. This method more closely approximates the magnitude of deflection seen during expected platform movement. The Labview data acquisition system allows for +/−10V inputs. To stay within this range the PZT chips were sized to not exceed this output at the maximum predicted movement of the dampers. With the 8 mm gap, the PZT voltage output is within the range of the daq capabilities. The leads from the PZT sensing element were wired into the first channel of the daq box and the Labview V.I. was setup accordingly.

To calculate the exact damping ratio the logarithmic decrement can be calculated, see FIG. 21. This log decrement result can then be equated directly to the damping ratio by means of eqn 7.2.

$$\delta = \frac{1}{n}\left(\frac{Y_0}{Y_n}\right) \qquad 7.1$$

$$\xi = \frac{\delta}{\sqrt{4\pi^2 + \delta^2}} \qquad 7.2$$

The results from the bench top test of the un-damped aluminum strips show a small amount of damping. The tip of the aluminum strip being tested was deflected down to the surface of the spacer block and data recording was initiated on the Labview VI. After the data acquisition was initiated the tip of the test specimen was released. The damping ratio can be seen with no calculations as the decrease in magnitude of the response over time. FIG. 22 shows that successive peaks of the plot reduce only slightly in magnitude. The movement deflection dampens to minimal levels at the end of the 10 second data record. The log decrement can be calculated from successive peaks of a graph, or the damping ratio, over a longer response period can be calculated by using peaks further apart.

FIG. 22 shows the response of the un-damped aluminum beam. Taking the magnitude of successive peaks of the response and plugging them into equations 7.1 and 7.2, the damping ratio of the raw aluminum strip is 0.000979.

FIG. 23 shows the response of the viscoelastic sandwich beam designed for use on the THP. This plot clearly shows that the damping has significantly increased. The magnitude from peak to peak decreases sharply with almost all movement damped out after only two seconds. This means that the viscoelastic material is performing properly and quickly dissipating energy. FIG. 24 shows the damped response of the viscoelastic beam more closely.

The Computer and DAQ box used in the benchtop testing of the single dampers was used for flight testing of the entire THP system. A set of dampers with PZT sensing chips installed on them was mounted to the frame of the THP. The leads of each damper PZT element were 25 feet long and were collected in a central bundle. The extremely low weight of the wires allowed for minimal impact on the response of the THP system. A variable output power supply was used to provide power to the THP. The THP was extended and retracted using a servo controller attached to a retraction mechanism. This allowed the height of the THP to be varied with the turn of a knob in a similar manner that is envisioned for production quality units. Further testing to simulate higher altitudes could be achieved by reducing the gait of the tethers at the base of the THP system, thus artificially creating the tether geometry of flight at higher altitudes like those tests conducted on the initial prototypes.

A fan setup 12 feet from the THP setup was used to create a wind gust to show the response of the THP. The fan was blocked with plastic panels and then the panels were quickly removed for two seconds to create a gust of air that hit the THP while in flight. The data acquisition was started when the panels were removed this shows the output from the PZT sensors for a short time before the gust travels across the room and reaches the THP in flight. The wind speed of the fan at the location of the THP was measured using a Kestrel hand held variometer. The fan had a low medium and high setting. On low the gust velocity was 5 knots, on medium it measured 7.5 knots and at high the gust velocity measured 12 knots. While the highest setting is still under the desired maximum gust speed that the THP is desired to eventually meet, it was the strongest gust that could be safely created for the THP at this time. The output from the fan had a swirling and unsteady nature. The fan was placed at the 12 feet distance to allow the unsteady nature of the gust to even out. A more calibrated and steady wind condition would be needed to test the full envelope of gust response for the current setup. Wind gusts in an outdoor environment are more uniform and consist of large uniform amounts of air, while the fan outputs a small concentrated column of air. This setup provides data to analyze the effect of adding constrained layer damping and proves feasible flight through a large segment of the desired flight envelope.

Flying Platform Results at 6 feet Without Damping
Flying Platform Results With Damping When operating at 20 feet, the platform exhibited good stability and was able to fly in calm air for over one hour. It was seen that the tension on the tethers was reduced due to the decreased thrust to weight ratio at that height. The tether angles with the base station were reduced but the dampers were seen to still provide adequate stability. The THP showed excellent stability and the high damping ratio at this test height can be seen in FIGS. 25, 26, 27 and 28.

TABLE 5

Summary of Calculated Flight Test Damping Coefficients

| Test Name | Damping Ratio |
|---|---|
| Undamped Platform Response, H¯6 ft | −0.0070 |
| Undamped Platform Response, H = 6 ft | 0.0049 |
| Damped Platform Response H¯6 ft | 0.0250 |
| Damped Platform Response H¯6 ft | 0.0166 |
| Damped Platform Response H = 20 ft Test 10 | 0.0460 |
| Damped Platform Response H = 20 ft Test 12 | 0.09174 |

Early testing showed the small fixed rotor platform can have 3 tethers instead of 4. Testing showed the concept to be worth further investigation but revealed consistent wobble type flight instability. This instability was investigated and it was found that the rotating momentum of the fixed propeller is the cause. Introducing system damping is an effective way to reduce the wobble instability to levels acceptable for the vehicle to perform the desired mission. Small lightweight passive dampers using a central constrained layer viscouselastic polymer proved sufficient to provide the needed damping. The overall system design proved to be light weight and low cost. The weight of the sized components allowed for a platform that requires very small dampers and allows for the small inexpensive motors to provide sufficient thrust. The test platform successfully demonstrated stabilized flight in gusty conditions and also showed stable flight up to 20 ft height. See FIGS. 29 and 30.

Referring to FIG. 31 and illustration of one embodiment of a THP is shown having ducted propellers and dampers.

The various tethered hovering platform examples shown above illustrate a novel tethered hovering platform design. A user of the present invention may choose any of the above tethered hovering platform embodiments, or an equivalent thereof, depending upon the desired application. In this regard, it is recognized that various forms of the subject invention could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

APPENDIX A

References

Hirschberg, M., and Daley, D., "US and Russian Helicopter Development in the 20$^{th}$ Century," American Helicopter Society International, July 2000.

"Rocke Achegelis Fa 330," http://en.wikipedia.org/wiki/Focke Achgelis Fa 330, [retrieved July 2008].

U.S. Centennial of Flight Commission, "Balloons in the American Civil War," http://www.centennialofflight.gov, [retrieved May 2008].

Goller, W., "Tethered Rotorplatforms and Their Mission Potential," AUVSI Library, 1980.

"Hiller VZ-1 'Pawnee'," http://www.aviastar.org/helicopters eng/hiller platform.php, [retrieved July 2008].

Taylor, John W. R., *Janes: All the Worlds Aircraft*, Sampson Low Marston and Co. LTD, London, 1971-1972.

Taylor, John W. R., *Janes: All the Worlds Aircraft*, Janes Publishing Co., London, 1979-1980.

Taylor, John W. R., *Janes: All the Worlds Aircraft*, Janes Publishing Co., London, 1966-1967.

Taylor, John W A., *Janes: All the Worlds Aircraft*, Janes Publishing Co., London, 1969-1970.

Tsach, S., Chemla, J., and Penn, D., "UAV Systems Development in IAI-Past, Present & Future," AIAA2003-6535, September 2003.

Avanzini, G. D'Angelo, S. and Matteis, G., "Development of a Shrouded-Fan UAV for Environmental Monitoring," AIAA 2004-6383, Chicago, Ill., September 2004.

"Sikhorsky Cypher", http://www.nosc.mil/robots/images/mssmp.jpg, [retrieved May 2008].

"CL-227 Sentinel/CL-327 Guardian," http://www.fas.org/man/dod-101/sys/ac/row/c1-327.htm, [retrieved May 2008].

Flemming, J., Jones, T., and Ng, W., "Improving Control System Effectiveness For Ducted Fan VTOL UAVs Operating in Crosswinds," AIAA 2003-6514, September 2003.
AD&D Hummingbird, http://www.aviastar.org/helicopters eng/add platform.php, [retrieved August 2007].
Crane, D., "Micro Air Vehicle: Backpackable UAV for Tactical Reconnaissance & Surveillance," Defense Review, May 2008.
"Micro Air Vehicle Spec. Sheet," Honeywell Corporation, www.honeywell.com, [retrieved May 2008].
"Honeywell's 13 inch Unmanned Aerial Vehicle completes successful 'untethered' free flight," Shephard Group, www.shephard.co.uk, [retrieved May 2008].
Brewer, K., U.S. Army Pfc., "High-Tech Micro Air Vehicle Will Battle with Soldiers," www.blackanthem.com [retrieved May 2008].
"UAVs get smaller: the Micro Air Vehicle nears readiness," www.gizmag.com, [retrieved May 2008].
"Infantry Unmanned Air Vehicle (UAV) Requirements and Issues," PowerPoint Presentation, U.S. Army Infantry Center, Ft. Benning Ga., May 2008.
Feickert, A., CRS Report for Congress, "The Army's Future Combat System (FCS): Background and Issues for Congress," 12 May, 2008.
Vehicles Collectors Club, http://www.armytrucks.org, [retrieved January 2008].
Photograph, http://www.defense-aerospace.com/base/util/82762 1.jpg, [retrieved 2008].
Downtown Baghdad Houses, http://pbase.com/sgt_chip/image/49252628, [retrieved June 2006].
Photograph, http://images.military.com, [retrieved July 2008].
Department of the Army, "Memorandum for the Commander, U.S. Army Training and Doctrine Command," Unclassified Version, Fort Leonard Wood, Mo., August 2007.
Gyrocam Systems, http://www.gyrocamsystems.com/home.html, [retrieved May 2008].
Photograph, http://www.mtreiten.com/soldier/Afghanistan-Sights.htm, [retrieved July 2008].
Spy Camera Specialists, www.spycameras.com, [retrieved January 2008].
Arora, J., *Introduction to Optimum Design*, McGraw Hill Series in Mechanical Engineering, 1989.
Prouty, R. W., *Helicopter Aerodynamics*, Access Intelligence LLC, Cincinnati, Ohio, 2007.
Prouty, R. W., *Helicopter Performance, Stability, and Control*, Krieger Publishing Company, Malabar, Fla., 2005.
Axi Brushless Outrunner 2203, http://www3.towerhobbies.com/cgibin/wti000 1p?&I=LXPPV2&P=FR [retrieved November 2007]
Thrust HP Software, http://ajmas.dyndns.org/thrusthp/imperial/ [retrieved July 2006]
Gladbach, A., and Spalding, A., "Analysis of Tethered Hovering Platform Gaits and Instability Control," June 2006.
Lim, K. B., Shin, J-Y, Moerder, D. D., Cooper, E. G., Khong, T. H., and Smith, M. F., "An Overview of the NASA Flying Test Platform Research," AIAA 2003-5775, August 2003.
Lim, K. B., Shin, J-Y, Moerder, D. D., "Bias Momentum Sizing for Hovering Dual-Spin Platforms" AIAA 2005-5973, August 2005
Hughes, Peter C., *Spacecraft Attitude Dynamics*, Dover Publications, Inc, Mineola, N.Y., 1986.
Leishman, Gordon J., *Principals of Helicopter Aerodynamics*, Cambridge University Press, Cambridge, N.Y., 2006.
Stepniewski, W. Z., and Keys, C. N., *Rotary-Wing Aerodynamics*, Dover Publications Inc., New York, 1984.
3M Corporation, "Viscoelastic Damping Polymer 110," Technical Data Sheet, April 2003.
Barrett-Gonzales, Ronald, *Introduction to Adaptive Aerostructures*, University of Kansas, 2006.
ASTM International, "Standard Test Method for Measuring Vibration-Damping Properties of Materials," E 756-04.
Photograph, http://en.wikipedia.org/wiki/Damping ratio [Retrieved August 2008]

APPENDIX B

List of Symbols

| Symbol | Definition | Units (SI) |
| --- | --- | --- |
| E | Young's modulus | Gpa (Msi) |
| G | shear modulus | Gpa (Msi) |
| F.M. | Figure of Merit | — |
| I | second moment of area | in4 (m4) |
| H | thickness | in (m) |
| H | Height | in (m) |
| N | Mode number | — |
| L | length | in (m) |
| W | Weight | lb (kg) |
| P | Shaft Power | Hp (W) |
| F | Force | lb (N) |
| T | Thrust | lb (N) |
| X | With respect to the x direction | — |
| y | With respect to the y direction | — |
| z | With respect to the z direction | — |
| V | velocity | ft/s (m/s) |
| L | Lift | lb (N) |
| D | Drag | lb (N) |
| A | Amperes | — |
|   | Area | $Ft^2$ ($m^2$) |
| Q | Torque | Ft-lb (N-m) |

Subscripts

| 1 | Denotes base | — |
| --- | --- | --- |
| 2 | Denotes damping layer | — |
| 3 | Denotes constraining layer | — |
| b | Denotes body | — |

Greek

| $\rho$ | Mass density | $lb/in^3$ ($kg/m^3$) |
| --- | --- | --- |
| $\xi_n$ | nth Eigenvalue | — |

Acronyms

| AC | Alternating Current |
| --- | --- |
| AGL | Above Ground Level |
| BDC | Brushed Direct Current |
| BLDC | Brushless Direct Current |
| CFD | Computational Fluid Dynamics |
| DC | Direct Current |
| FBD | Free Body Diagram |
| HMMWV | High Mobility Multipurpose Wheeled Vehicle |
| MMPV | Medium Mine Protected Vehicle |
| THP | Tethered Hovering Platform |
| UAV | Unmanned Air Vehicle |
| VTOL | Vertical Takeoff and Landing |

What is claimed is:

1. A tethered hovering platform adapted to hover above a base station, comprising:

a propeller configuration selected from a group of propeller configurations consisting of a single propeller configuration, a counter rotating propeller configuration, a three propeller located co-planar configuration and a four propeller located co-planar configuration;

a propulsion configuration provided by a motor, connected to a gear system that drives the propeller configuration;

said platform, including a thrust duct outer ring cylindrically ducting the motor and propeller configuration, said thrust duct outer ring having a periphery; and a damping device mounted cantilever from the periphery of the thrust duct outer ring, wherein the platform is attached to a base station by a tether attached to the damping device mounted cantilever from the periphery of thrust duct outer ring of the platform, and wherein said damping device is structured to deflect along its longitudinal axis to provide damping during flight.

2. The tethered hovering platform as recited in claim 1, further comprising multiple tethers attaching the base station to multiple damping devices mounted cantilever to a thrust duct outer ring of said platform.

3. The tethered hovering platform as recited in claim 2, where the damping devices are selected from a group consisting of constrained layer damping beams attached cantilever to the platform, spring mass damper fixtures, and miniature hydraulic damping fixtures.

4. The tethered hovering platform as recited in claim 3 further comprising high damping fixtures attached to the tethers and mounted on the base station.

5. The tethered hovering platform as recited in claim 1, where the damping devices are up-bent pre-loaded constrained layer damping beams for providing maximum damping and allowing the dampers to deflect to about a nearly flat horizontal plane in flight.

6. The tethered hovering platform as recited in claim 1, further comprising a PZT device attached to the dampers and operable to monitor and relay the damped and un-damped performance parameters of the craft.

7. The tethered hovering platform as recited in claim 6, where the PZT device further comprises a transmitter operable to transmit the damped and un-damped performance parameters to a receiver on the base station.

8. The tethered hovering platform as recited in claim 7, further comprising reactionary flight controls combined with passive damping techniques to provide necessary flight envelope expansion including gyro reactionary turning vanes and automated tension changing devices on the platform operable to respond to performance parameters transmitted by the PZT device.

9. The tethered hovering platform as recited in claim 7, further comprising reactionary flight controls combined with passive damping techniques to provide necessary flight envelope expansion including automated tension changing devices on the base station that aid in stabilizing the platform operable to respond to performance parameters transmitted by the PZT device.

10. The tethered hovering platform as recited in claim 1, further comprising reactionary flight controls combined with passive damping techniques to provide necessary flight envelope expansion including gyro reactionary turning vanes on the platform and automated tension changing devices on the platform or on the base station that aid in stabilizing the platform.

11. The tethered hovering platform as recited in claim 10, further comprising materials to reduce visual signature selected from a group consisting of color changing coatings, applications, and complicated patterns to reduce visibility for visual signature suppression techniques.

12. The tethered hovering platform as recited in claim 11, further comprising audible signature suppression implemented in the design to reduce the audible signature to minimal levels.

13. The tethered hovering platform as recited in claim 1, further comprising fixed and interchangeable payloads on the platform, where payloads are selected from a group consisting of visual sensors, radio communication equipment, and gas/atmospheric sensors for chemical.

14. A tethered hovering platform adapted to hover above a base station, comprising:

a ducted propulsion configuration provided by a motor, connected to a gear system that drives a ducted propeller configuration, where the ducted propulsion configuration and the ducted propeller configuration includes a thrust duct outer ring cylindrically about the ducted propulsion configuration and the ducted propeller configuration;

a platform, including the duct outer ring and a damping device mounted cantilever from a periphery of the duct outer ring, wherein the platform is attached to a base station by a tether attached to the damping device mounted cantilever from the periphery of said duct outer ring of the platform, and wherein said damping device is structured to deflect along its longitudinal axis to provide damping during flight.

15. The tethered hovering platform as recited in claim 14, further comprising multiple tethers attaching the base station to multiple damping devices mounted to the thrust duct outer ring of said platform.

16. The tethered hovering platform as recited in claim 15, where the damping devices are selected from a group consisting of constrained layer damping beams attached cantilever to the platform, spring mass damper fixtures, and miniature hydraulic damping fixtures.

17. The tethered hovering platform as recited in claim 16 further comprising high damping fixtures attached to the tethers and mounted on the base station.

18. The tethered hovering platform as recited in claim 15, where the damping devices are up-bent pre-loaded constrained layer damping beams for providing maximum damping and allowing the dampers to deflect to about a nearly flat horizontal plane in flight.

19. The tethered hovering platform as recited in claim 18, further comprising a PZT device attached to the damping devices and operable to monitor and relay the damped and un-damped performance parameters of the craft.

20. The tethered hovering platform as recited in claim 19, where the PZT device further comprises a transmitter operable to transmit the damped and un-damped performance parameters to a receiver on the base station.

21. The tethered hovering platform as recited in claim 20, further comprising reactionary flight controls combined with passive damping techniques to provide necessary flight envelope expansion including gyro reactionary turning vanes and automated tension changing devices on the platform operable to respond to performance parameters transmitted by the PZT device.

22. The tethered hovering platform as recited in claim 20, further comprising reactionary flight controls combined with passive damping techniques to provide necessary flight envelope expansion including automated tension changing devices on the base station that aid in stabilizing the platform operable to respond to performance parameters transmitted by the PZT device.

23. The tethered hovering platform as recited in claim 18, further comprising reactionary flight controls combined with passive damping techniques to provide necessary flight envelope expansion including gyro reactionary turning vanes on the platform and automated tension changing devices on the platform or on the base station that aid in stabilizing the platform.

24. The tethered hovering platform as recited in claim 18, further comprising materials to reduce visual signature selected from a group consisting of color changing coatings, applications, and complicated patterns to reduce visibility for visual signature suppression techniques.

25. The tethered hovering platform as recited in claim 18, further comprising audible signature suppression implemented in the design to reduce the audible signature to minimal levels.

26. The tethered hovering platform as recited in claim 18, further comprising fixed and interchangeable payloads on the platform, where payloads are selected from a group consisting of visual sensors, radio communication equipment, and gas/atmospheric sensors for chemical.

27. A tethered hovering platform adapted to hover above a base station, comprising:
- a ducted propulsion configuration provided by a motor, connected to a gear system that drives a ducted propeller configuration, where the ducted propulsion configuration and the ducted propeller configuration includes a thrust duct outer ring cylindrically about the ducted propulsion configuration and the ducted propeller configuration;
- a platform including the thrust duct outer ring and multiple damping devices mounted cantilever from a periphery of the thrust duct outer ring, wherein said platform is attached to a base station by multiple tethers attaching the base station to the multiple damping devices mounted cantilever from the periphery of a thrust duct outer ring of said platform, and wherein said multiple damping devices are structured to deflect along their longitudinal axes to provide damping during flight,
- where the damping devices are selected from a group consisting of constrained layer damping beams attached cantilever to the platform, spring mass damper fixtures, and miniature hydraulic damping fixtures.

28. The tethered hovering platform as recited in claim 27 where the damping devices are constrained layer damping beams attached cantilever to the platform and are up-bent pre-loaded constrained layer damping beams for providing maximum damping and allowing the dampers to deflect to about a nearly flat horizontal plane in flight.

29. The tethered hovering platform as recited in claim 28, further comprising a PZT device attached to the damping devices and operable to monitor and relay the damped and un-damped performance parameters of the craft, where the PZT device further comprises a transmitter operable to transmit the damped and un-damped performance parameters to a receiver on the base station.

30. The tethered hovering platform as recited in claim 29, further comprising reactionary flight controls combined with passive damping techniques to provide necessary flight envelope expansion including gyro reactionary turning vanes and automated tension changing devices on the platform operable to respond to performance parameters transmitted by the PZT device.

* * * * *

UNITED STATES PATENT AND TRADEMARK OFFICE
CERTIFICATE OF CORRECTION

| | | |
|---|---|---|
| PATENT NO. | : 8,777,157 B2 | Page 1 of 1 |
| APPLICATION NO. | : 12/610055 | |
| DATED | : July 15, 2014 | |
| INVENTOR(S) | : Barrett et al. | |

It is certified that error appears in the above-identified patent and that said Letters Patent is hereby corrected as shown below:

In the Specification

Col. 3, line 37, delete "(62 ml)" and replace with -- (62 mi) --

Signed and Sealed this
Second Day of December, 2014

Michelle K. Lee
*Deputy Director of the United States Patent and Trademark Office*